(12) United States Patent
Li et al.

(10) Patent No.: US 10,341,985 B2
(45) Date of Patent: Jul. 2, 2019

(54) AREA CALIBRATION AND BEAMFORMING REFINEMENT

(71) Applicant: QUALCOMM Incorporated, San Diego, CA (US)

(72) Inventors: Junyi Li, Chester, NJ (US); Ashwin Sampath, Skillman, NJ (US); Ozge Koymen, Princeton, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/925,020

(22) Filed: Mar. 19, 2018

(65) Prior Publication Data

US 2018/0324743 A1     Nov. 8, 2018

Related U.S. Application Data

(60) Provisional application No. 62/501,593, filed on May 4, 2017.

(51) Int. Cl.
| | |
|---|---|
| *H04L 5/12* | (2006.01) |
| *H04W 64/00* | (2009.01) |
| *H04B 7/06* | (2006.01) |
| *H04B 7/022* | (2017.01) |
| *H04B 7/08* | (2006.01) |
| *H04W 16/28* | (2009.01) |

(52) U.S. Cl.
CPC .......... *H04W 64/006* (2013.01); *H04B 7/022* (2013.01); *H04B 7/0617* (2013.01); *H04B 7/0695* (2013.01); *H04B 7/088* (2013.01); *H04B 7/0834* (2013.01); *H04W 16/28* (2013.01); *H04B 7/0639* (2013.01); *H04B 7/0641* (2013.01)

(58) Field of Classification Search
CPC . H04W 64/006; H04B 7/0617; H04B 7/0639; H04B 7/0641
USPC .......................... 375/262, 260, 259, 219, 295
See application file for complete search history.

(56) References Cited

U.S. PATENT DOCUMENTS

| | | | |
|---|---|---|---|
| 9,331,760 B2 | 5/2016 | El et al. | |
| 2013/0094440 A1* | 4/2013 | Moshfeghi | H04W 88/06 370/328 |
| 2016/0014566 A1 | 1/2016 | Bengtsson et al. | |
| 2016/0065286 A1 | 3/2016 | Kim et al. | |

(Continued)

FOREIGN PATENT DOCUMENTS

WO     2012033713 A1     3/2012

OTHER PUBLICATIONS

International Search Report and Written Opinion—PCT/US2018/023203—ISA/EPO—dated Jun. 12, 2018.

*Primary Examiner* — Zewdu A Kassa
(74) *Attorney, Agent, or Firm* — Nerrie M. Zohn

(57) ABSTRACT

A wireless device of the present disclosure may be able to reduce the time needed to determine a subarray and/or beamforming direction used for mmW communication. In an aspect of the disclosure, a method, a computer-readable medium, and an apparatus are provided. In one aspect, the apparatus may maintain first information associated with a correlation between each of a plurality of wireless device positions and wireless device orientations and a plurality of nodes, at least one subarray, and a corresponding beamforming direction. In another aspect, the apparatus may transmit the first information associated with the correlation to a plurality of nodes.

30 Claims, 16 Drawing Sheets

(56) References Cited

U.S. PATENT DOCUMENTS

2016/0118716 A1* 4/2016 Stephenne ............... H01Q 3/34
                                                    342/372
2016/0330643 A1   11/2016 Sahin et al.
2017/0111852 A1    4/2017 Selén et al.
2017/0359106 A1   12/2017 John et al.

* cited by examiner

AREA CALIBRATION AND BEAMFORMING REFINEMENT

CROSS-REFERENCE TO RELATED APPLICATION(S)

This application claims the benefit of U.S. Provisional Application Ser. No. 62/501,593, entitled "AREA CALIBRATION AND BEAMFORMING REFINEMENT" and filed on May 4, 2017, which is expressly incorporated by reference herein in its entirety.

BACKGROUND

Field

The present disclosure relates generally to communication systems, and more particularly, to determining beamforming calibration information and refining the beamforming calibration information while a wireless device is in operational mode.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

One way to meet the increasing demand for mobile broadband may be to utilize the millimeter wave (mmW) spectrum in addition to LTE. Communications using the mmW spectrum may experience extremely high path loss and a short range. Beamforming may be used to compensate for the high path loss and short range. However, due to the potentially large number of antennas at an mmW node (e.g., mmW base station, mmW access point (AP), etc.) and subarrays at a wireless device, the number of possible beamforming directions that may need to be scanned during a beamforming procedure can be quite large. A scanning process for a large number of potential beamforming directions may take an undesirable amount of time and create significant beam overhead.

Thus, there is a need for a technique that reduces the time needed to determine a subarray and/or beamforming direction used for mmW communication and that reduces the amount of beam overhead.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One way to meet the increasing demand for mobile broadband may be to utilize the mmW spectrum in addition to LTE. Communications using the mmW spectrum may experience extremely high path loss and a short range. Beamforming may be used to compensate for the high path loss and short range. For example, a virtual reality (VR) device may be equipped with multiple subarrays of mmW antennas for receiving signals from an mmW node.

However, due to the potentially large number of antennas at an mmW node (e.g., mmW base station, mmW AP, etc.) and subarrays of mmW antennas at a wireless device (e.g., a user equipment (UE), VR wireless device, STA, cell phone, smart phone, etc.), the number of possible beamforming directions that may be scanned during a beamforming procedure can be quite large. For example, a wireless device may connect to a serving mmW node, and one or multiple subarrays at the wireless device may be beamformed with the serving mmW node prior to initiating mmW communications. A scanning process for a large number of potential beamforming directions may take an undesirable amount of time and create significant beam overhead.

Thus, there is a need for a technique that reduces the time needed to determine a subarray and/or beamforming direction used for mmW communication and that reduces the amount of beam overhead.

The present disclosure provides a solution by enabling a wireless device to maintain beamforming calibration information that includes a correlation between at least one of a plurality of wireless device positions and/or wireless device orientations, and a plurality of mmW nodes, at least one mmW subarray at the wireless device, and a corresponding beamforming direction associated with at least one of a particular position and/or orientation of the wireless device. Using information obtained with sensors located at the wireless device, the wireless device may be able to determine the position and/or orientation of the wireless device. The wireless device may then use the beamforming calibration information to select at least one of a beamforming direction, an mmW subarray, and/or an mmW node based on the determined position and/or orientation without performing a scanning process for each of the possible beamforming directions.

Consequently, a wireless device of the present disclosure may be able to reduce the time needed to determine a subarray and/or beamforming direction to use for mmW communication.

In an aspect of the disclosure, a method, a computer-readable medium, and an apparatus are provided. In one aspect, the apparatus may maintain first information associated with a correlation between each of a plurality of wireless device positions and wireless device orientations and a plurality of nodes, at least one subarray, and a corresponding beamforming direction. In another aspect, the apparatus may transmit the first information associated with the correlation to a plurality of nodes.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
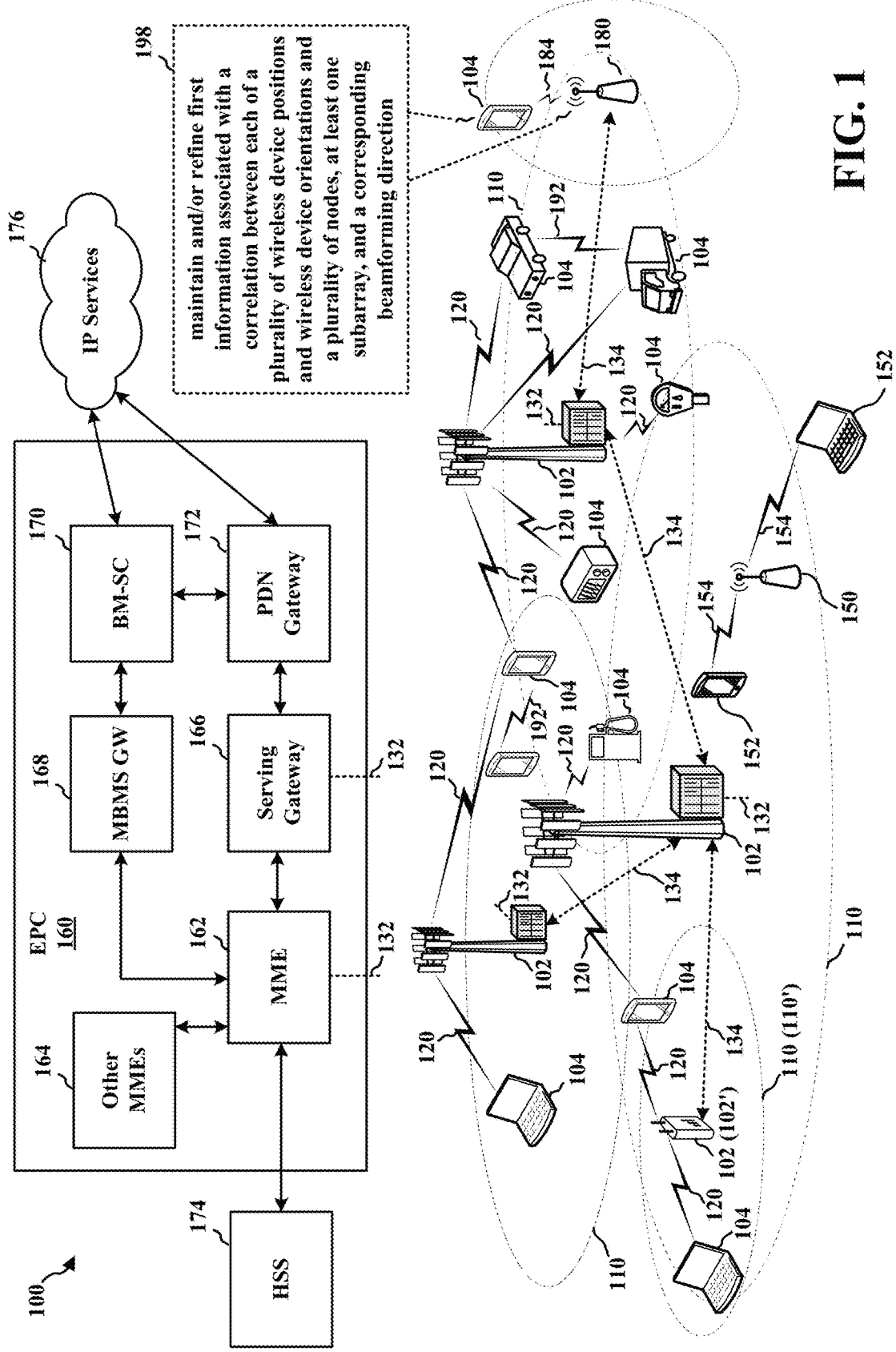
FIG. 1 is a diagram illustrating an example of a wireless communications system and an access network.
Figure 2:
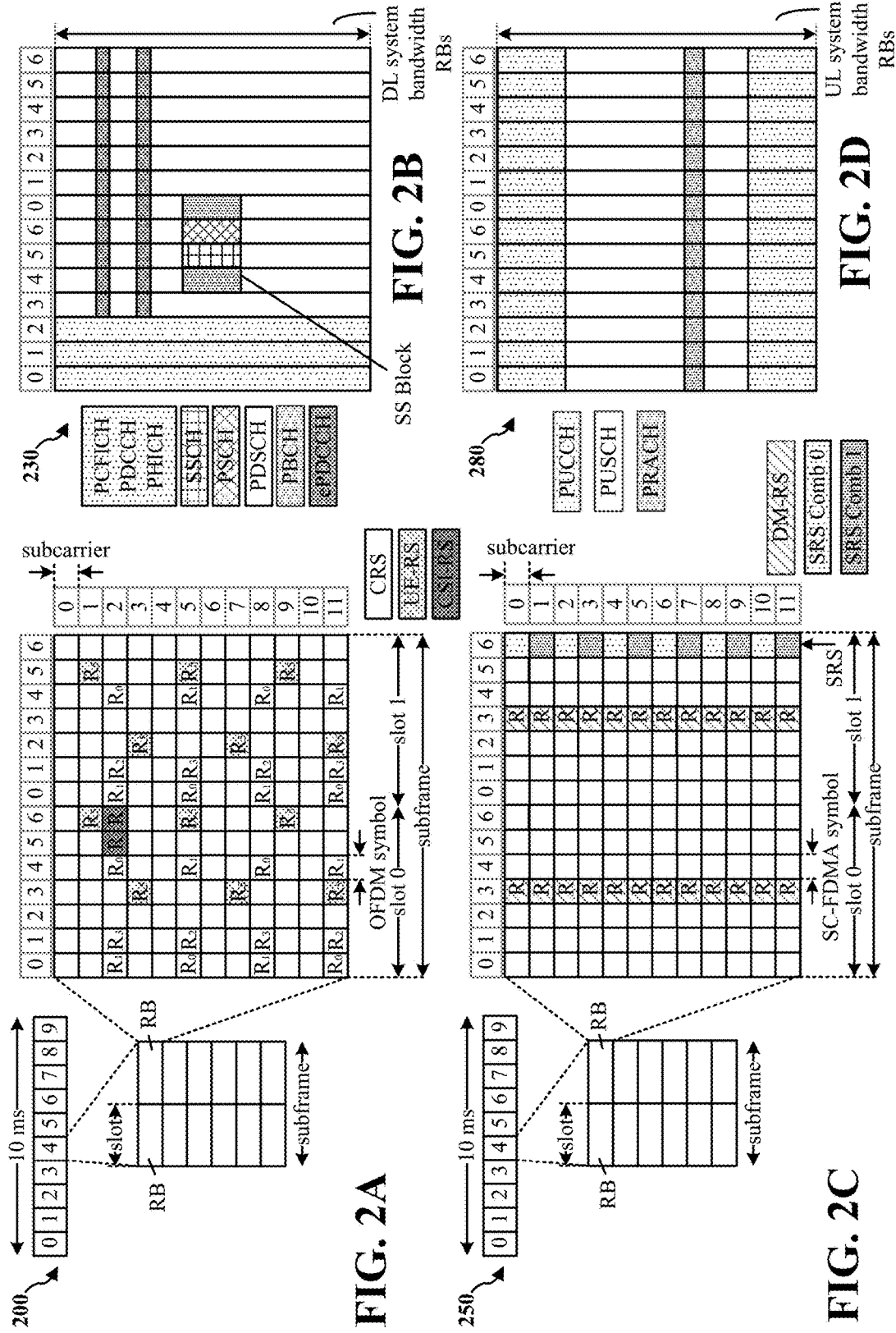
FIGS. 2A, 2B, 2C, and 2D are diagrams illustrating examples of a DL frame structure, DL channels within the DL frame structure, an UL frame structure, and UL channels within the UL frame structure, respectively.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a wireless device such as the UE 104/STA 152/base station 180 may be configured to maintain and/or refine first information associated with a correlation between each of a plurality of wireless device positions and wireless device orientations and a plurality of nodes, at least one subarray, and a corresponding beamforming direction (198), e.g., as described below in connection with any of FIGS. 2A-10.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
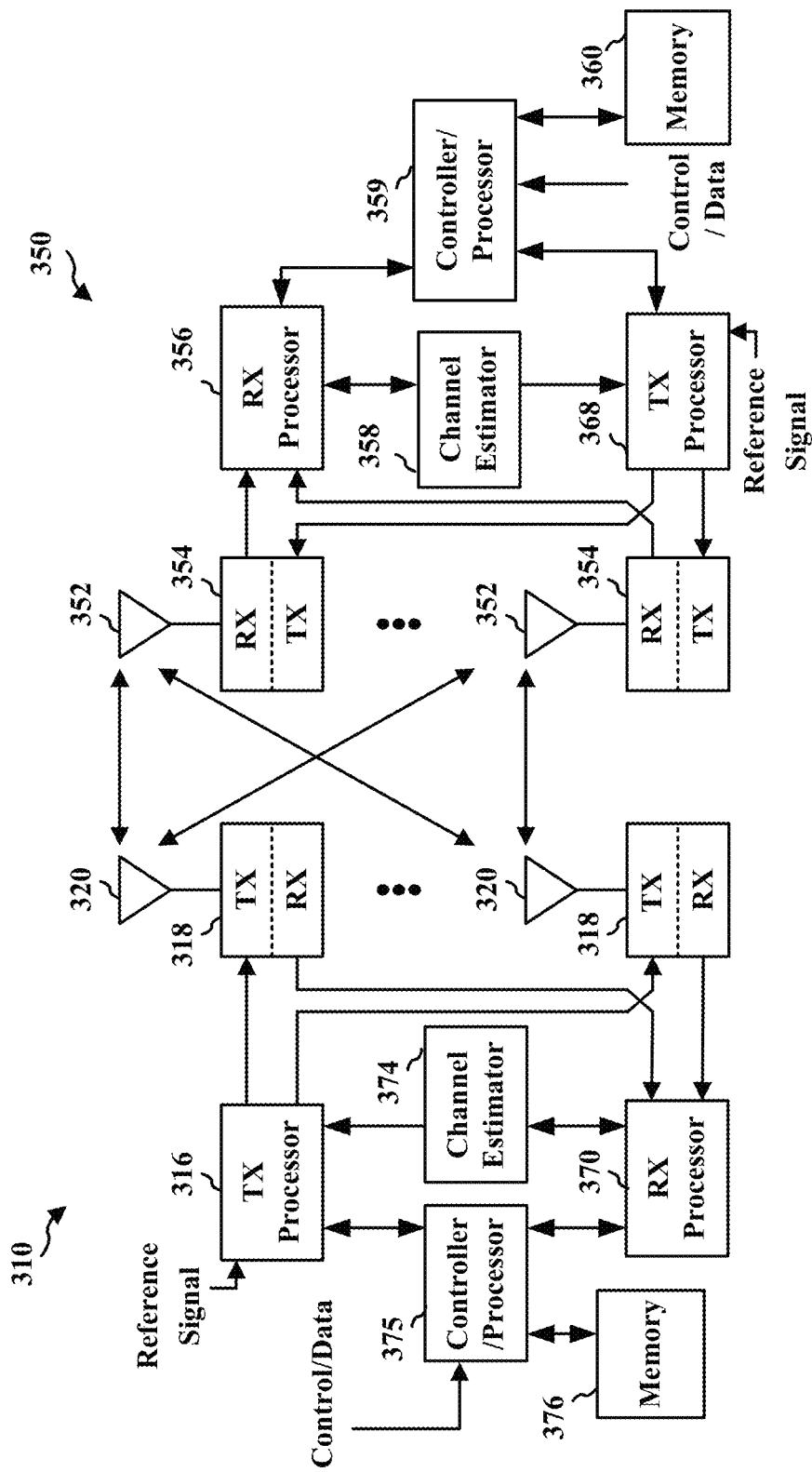
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC)

coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
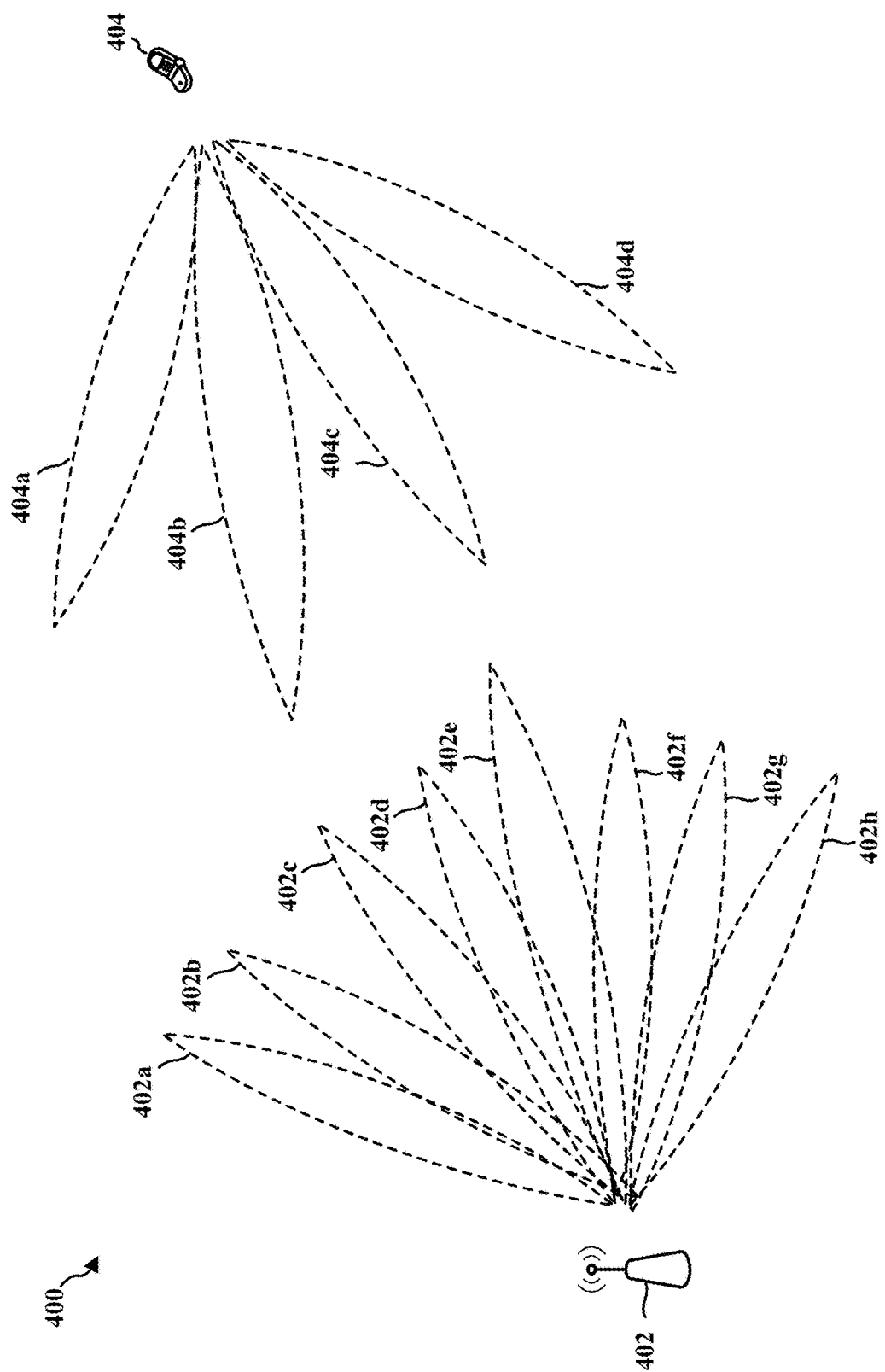
FIG. 4 is a diagram illustrating a base station in communication with a UE.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

One way to meet the increasing demand for mobile broadband may be to utilize the mmW spectrum in addition to LTE. Communications using the mmW spectrum may experience extremely high path loss and a short range. Beamforming may be used to compensate for the high path loss and short range. For example, a VR wireless device may be equipped with multiple subarrays of mmW antennas.

However, due to the potentially large number of antennas at an mmW node (e.g., mmW base station, mmW AP, etc.) and subarrays of mmW antennas at a wireless device (e.g., a UE, VR wireless device, STA, cell phone, smart phone, etc.), the number of possible beamforming directions that may need to be scanned during a beamforming procedure can be quite large.

For example, a wireless device may connect to a serving mmW node, and one or multiple subarrays at the wireless device may be beamformed with the serving mmW node prior to initiating mmW communications (e.g., (e.g., using the 802.11ad LAN protocol for short-range indoor and/or outdoor mmW communications). As the wireless device moves, the wireless device may adjust the beamforming direction, the beamforming coefficients (e.g., used to determine a beamforming direction), wireless device subarray selections, or even hand off to a different mmW node. In addition, the serving mmW node may adjust a beamforming direction, beamforming coefficient, and/or the mmW antennas used for mmW communication with a wireless device that is moving.

To this end, both the wireless device and the mmW node may scan through a plurality of TX/RX beams to measure the channel quality of a variety of TX/RX beam pairs (e.g., beamforming directions), and adjust one or more of a beamforming direction, beamforming coefficient, wireless device subarray selections, and/or the mmW antennas based on the scanning process. A scanning process for a large number of potential beamforming directions may take an undesirable amount of time and create significant beam overhead.

Thus, there is a need for a technique that reduces the time needed to determine a subarray and/or beamforming direction used for mmW communication.

The present disclosure provides a solution by enabling a wireless device to maintain beamforming calibration information that includes a correlation between at least one of a plurality of wireless device positions and/or wireless device orientations, and a plurality of mmW nodes, at least one mmW subarray at the wireless device, and a corresponding beamforming direction associated with at least one of a particular position and/or orientation of the wireless device. Using information obtained with sensors located at the wireless device, the wireless device may be able to determine the position and/or orientation of the wireless device. The wireless device may then use the beamforming calibration information to select at least one of a beamforming direction, an mmW subarray, and/or an mmW node based on the determined position and/or orientation without performing a scanning process for each of the possible beamforming directions.

Consequently, a wireless device of the present disclosure may be able to reduce the time needed to determine a subarray and/or beamforming direction used for mmW communication, e.g., as described below in connection with any of FIGS. 5A-10.

FIGS. 5A-5E illustrate a data flow 500 between a wireless device 502, a first node 504, and a second node 506 that may reduce the time needed to select a node, a subarray, and/or beamforming direction used for mmW communications in accordance with certain aspects of the disclosure. The wireless device 502 may correspond to, e.g., UE 104, 350, STA 152, wireless device 602, 702, the apparatus 902/902'. The first node 504 may correspond to, e.g., base station 102, 180, eNB 310, node 604, 606, 608, 704, 706, 708, 950, 955. The second node 506 may correspond to, e.g., base station 102, 180, eNB 310, node 604, 606, 608, 704, 706, 708, 950, 955. In addition, the wireless device 502, the first node 504, and the second node 506 may be configured to communicate using any type of mmW communication discussed above with respect to FIG. 1. Although two nodes are illustrated in FIGS. 5A-5E, more or fewer than two nodes may be used to determine the beamforming calibration information and/or refine the beamforming calibration information described in connection to FIGS. 5A-5E without departing form the scope of the present disclosure.

Figure 5A:
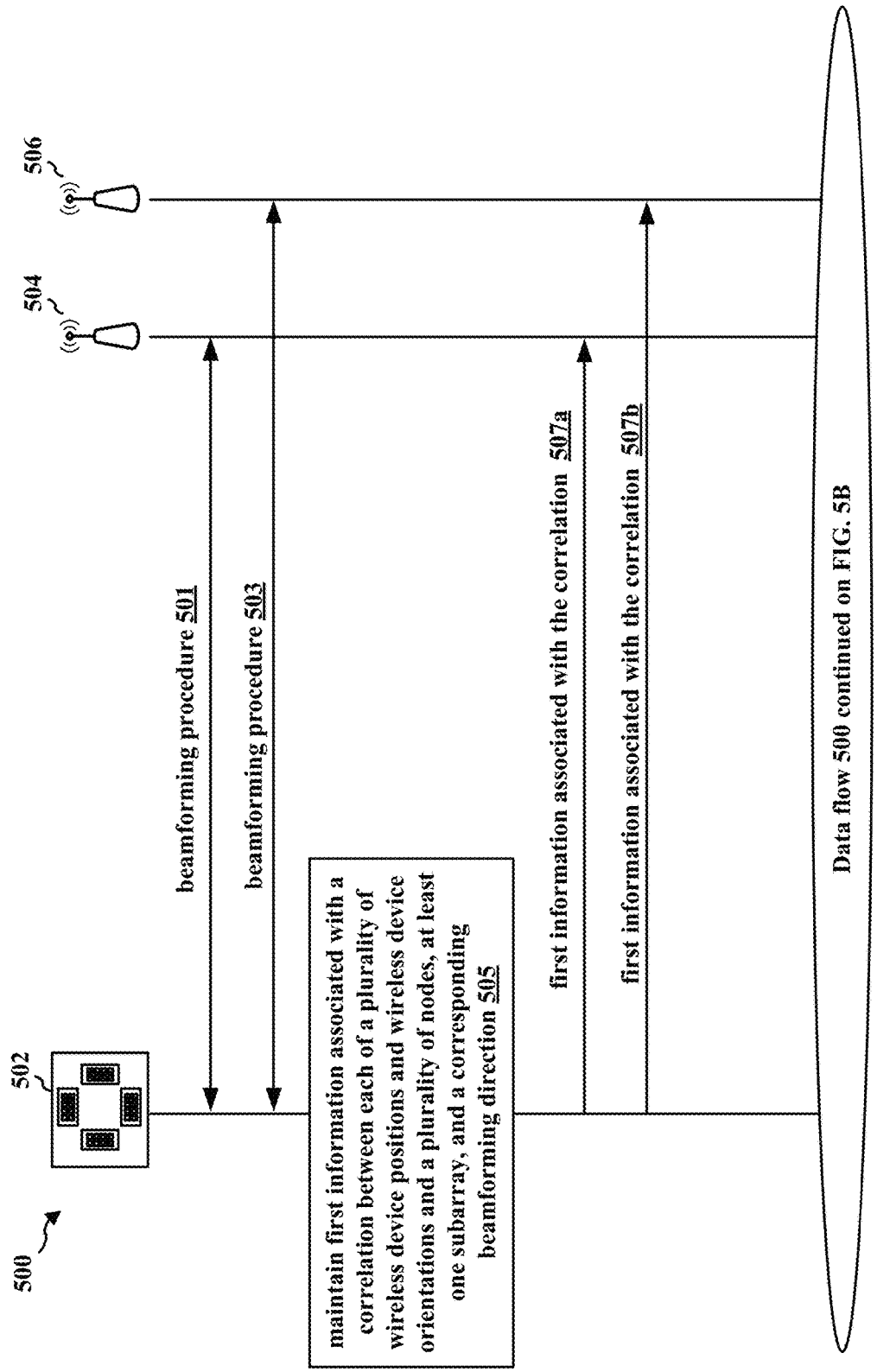
FIGS. 5A-5E illustrate a data flow between a wireless device and a plurality of nodes in accordance with certain aspects of the disclosure.

Referring to FIG. 5A, the wireless device 502 may perform a beamforming procedure 501, 503 by moving through an area that includes the first node 504 and the second node 506 (e.g., see the beamforming procedure described below in connection with FIG. 6). For example, the area may include a VR room with the first node 504 and the second node 506, a home with the first node 504 and the second node 506, an office space with the first node 504 and the second node 506, a shopping mall with the first node 504 and the second node 506, an indoor space with the first node 504 and the second node 506, an outdoor space with the first node 504 and the second node 506, and/or a mixed indoor/outdoor space with the first node 504 and the second node 506, etc.

Figure 7:
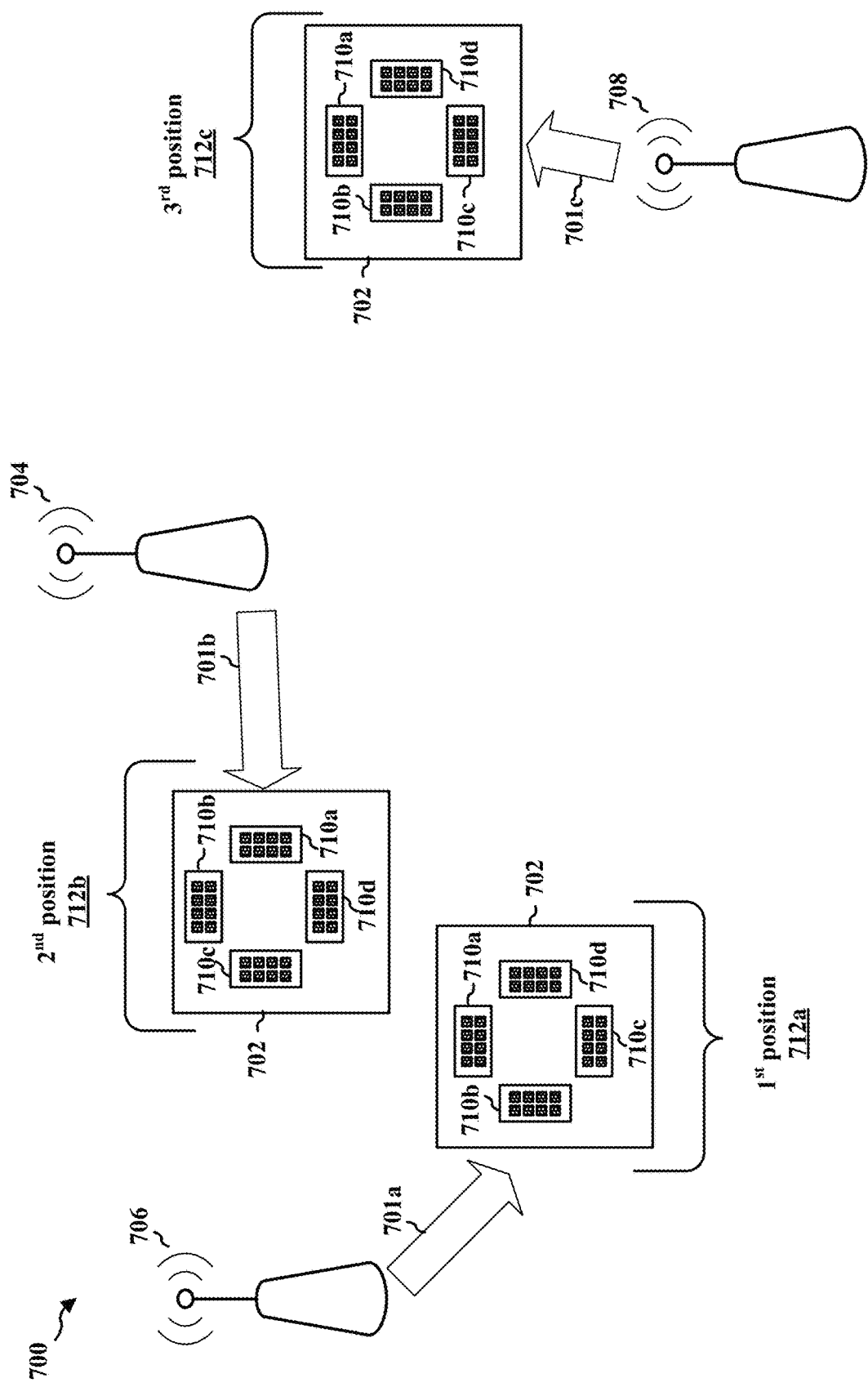
FIG. 7 illustrates a predictive beamforming procedure in accordance with certain aspects of the disclosure.

The wireless device 502 may perform the beamforming procedure 501, 503 with one or more of the first node 504 and/or the second node 506 by scanning through a plurality of different beam directions (e.g., see 402a, 402b, 402c, 402d, 402e, 402f, 402g, 402h, 404a, 404b, 404c, 404d in FIG. 4) that are each associated with a particular location and/or orientation (e.g., an orientation of subarrays at the wireless device—see FIG. 7) of the wireless device 502. In one aspect, the wireless device 502 may perform the beamforming procedure 501, 503 before entering an operational mode to begin mmW communication with the first node 504 and/or the second node 506.

Based on the beamforming procedure 501, 503 performed at each location and/or each orientation, the wireless device 502 may determine, e.g., at least one of a preferred beamforming direction, a preferred subarray (e.g., see 610a, 610b, 610c, 610d in FIG. 6), and/or a preferred node for each location. Each location and/or orientation of the wireless device 502 may be determined based on sensor measurements (e.g., global positioning system (GPS) measurement, accelerometer measurements, and/or gyroscope measurements, etc.) taken at the wireless device 502. For example, as the wireless device 502 moves through the area discussed above, the wireless device 502 may record position information (e.g., associated with the position of the wireless device 502) and orientation information (e.g., associated with the orientation of the subarrays of the wireless device 502), and a preferred node, a preferred subarray, and/or a preferred beamforming direction associated with each location and/or orientation. In addition, depending on the orientation of the wireless device 502, one or more of the subarrays (e.g., see subarrays 710a, 710b, 710c, 710d in FIG. 7) may be covered, e.g., by a user's hand. The gyroscope measurement(s) may indicate which of the subarrays are covered, e.g., by a user's hand. If one of the subarrays is covered, certain beams associated with the covered subarray may be unavailable for mmW communications with one or more nodes, and hence, may not be used for beamforming even if that beam is the preferred beam. In such a scenario, a beam with a second highest preference for that location and/or orientation may be used when the preferred beam is blocked by the user's hand.

In one aspect, the location information may be obtained using, e.g., a GPS and/or accelerometer located at the wireless device 502. The orientation information may be obtained using, e.g., a gyroscope located at the wireless device 502. The preferred node, the preferred subarray, and/or the preferred beamforming direction may be determined, e.g., based on a particular signal parameter (e.g., the highest signal strength, the signal with the highest quality-of-service (QoS), a signal that experiences the least amount of interference, etc.) associated with a particular node, a particular subarray, and/or a particular beamforming direction. In one configuration, the wireless device 502 may determine multiple combinations of preferred nodes, subarrays, and/or beamforming directions for each location, and rank each combination based on preference.

In a first configuration, the beamforming procedure 501, 503 may include determining a preferred beamforming direction, a preferred subarray, and a preferred node for a particular location. In a second configuration, the beamforming procedure 501, 503 may include determining a preferred beamforming direction, a preferred subarray, and a preferred node for a particular location and a particular orientation associated with that location.

In certain aspects, the wireless device 502 may maintain 505 first information (e.g., beamforming calibration information) that includes a correlation between each of a plurality of wireless device positions and wireless device orientations, and at least one preferred node, at least one preferred subarray, and at least one preferred beamforming direction obtained during the beamforming procedure 501, 503. In one aspect, the first information (e.g., look-up-table of beamforming calibration information) may be maintained locally at the wireless device 502. In another configuration, the first information may be maintained externally to the wireless device 502, and accessed by the wireless device 502 using one of radio access technologies discussed above.

In another aspect, the wireless device 502 may transmit the first information 507a, 507b to the first node 504 and the second node 506.

Figure 5B:
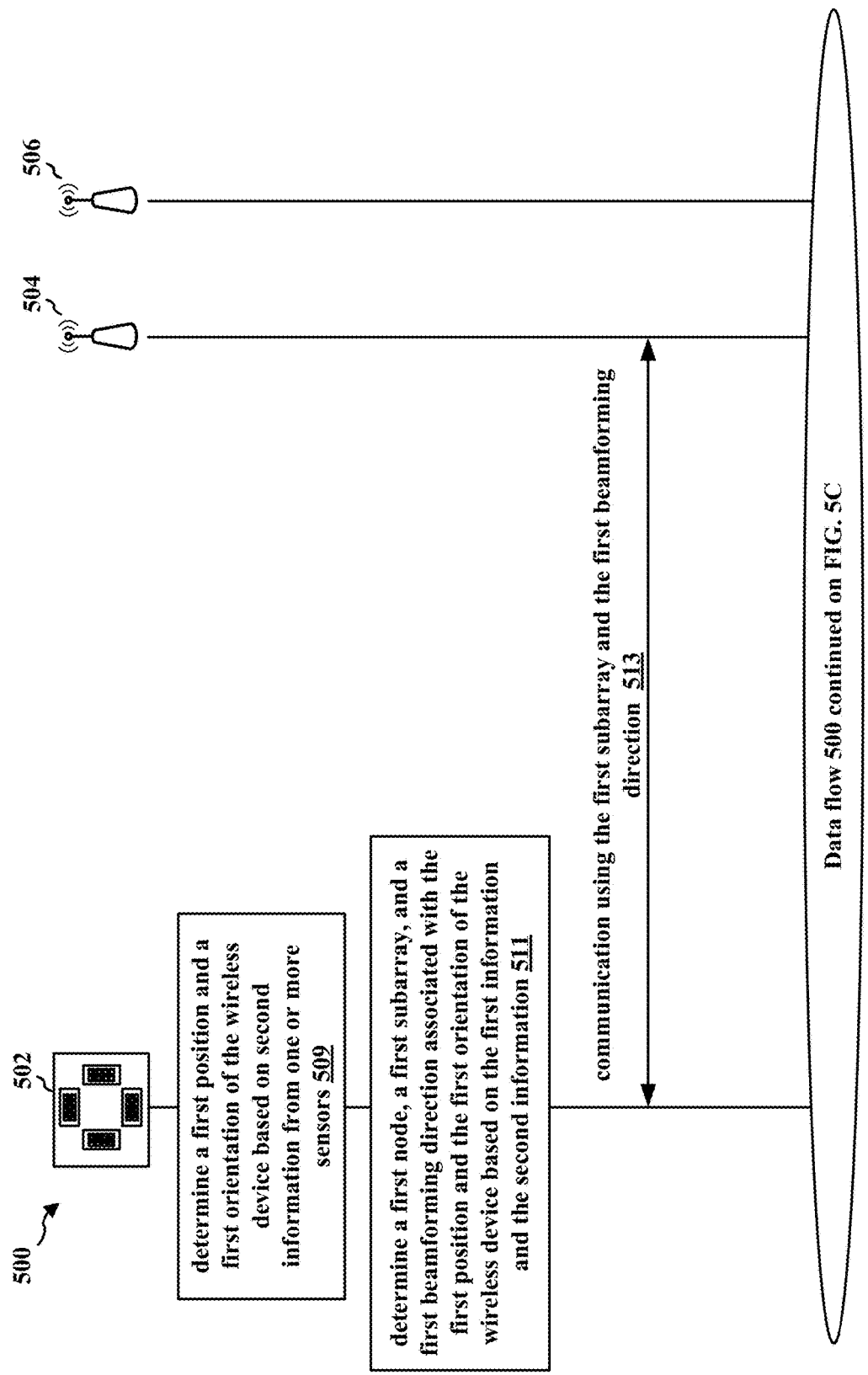

Referring to FIG. 5B, once in operational mode, the wireless device 502 may determine 509 a first position (e.g., see first position 712a in FIG. 7) and/or a first orientation (e.g., see the orientation of subarrays at the first position 712a in FIG. 7) of the wireless device 502 based on second information (e.g., position information and/or orientation information) using measurements taken by one or more sensors at the wireless device 502. For example, the location information may be obtained using, e.g., a GPS and/or an accelerometer located at the wireless device 502. The orientation information may be obtained using, e.g., a gyroscope located at the wireless device 502.

In a further aspect, using the first information and/or the second information, the wireless device 502 may determine 511 a preferred node, a preferred subarray, and a preferred beamforming direction associated with the first position and/or the first orientation of the wireless device 502 (e.g., predictive beamforming—see FIG. 7). For example, the wireless device 502 may determine a first node (e.g., second node 706 in FIG. 7), a first subarray (e.g., subarray 710b in FIG. 7), and a first beamforming direction (e.g., beamforming direction 701a in FIG. 7) based on the first information and the second information. In one aspect, the wireless device 502 may access the look-up-table that includes the first information, and using the current location and/or orientation information, the wireless device 502 may determine which of the nodes, subarrays, and/or beamforming directions to use for mmW communications without performing a scanning procedure. In the particular example illustrated in FIG. 5B, the wireless device 502 determines to communicate 513 with the first node 504, using a first subarray, and a first beamforming direction.

The look-up-table may include, e.g., a hierarchy of different combinations of preferred nodes, subarrays, and/or beamforming directions for each position that are ranked based on preference. For example, if the highest ranked combination (e.g., a first node, a first subarray, and/or a first beamforming direction) does not support mmW communications (e.g., if the first subarray is covered by the user's hand), then the wireless device 502 may select the second highest ranked combination (e.g., a second node, a second subarray, and/or a second beamforming direction) for mmW communications. In one aspect, one or more of the first node, first subarray, and/or first beamforming direction in the highest ranked combination may be the same as the second node, the second subarray, and/or the second beamforming direction in the second highest ranked combination. In another aspect, one or more of the first node, first subarray, and/or first beamforming direction in the highest ranked combination may be the different than the second node, the second subarray, and/or the second beamforming direction in the second highest ranked combination. For example, the highest ranked combination may include node x, subarray x, and beamforming direction x, and the second highest ranked combination may include node y, subarray x, and beamforming direction x.

Figure 5C:
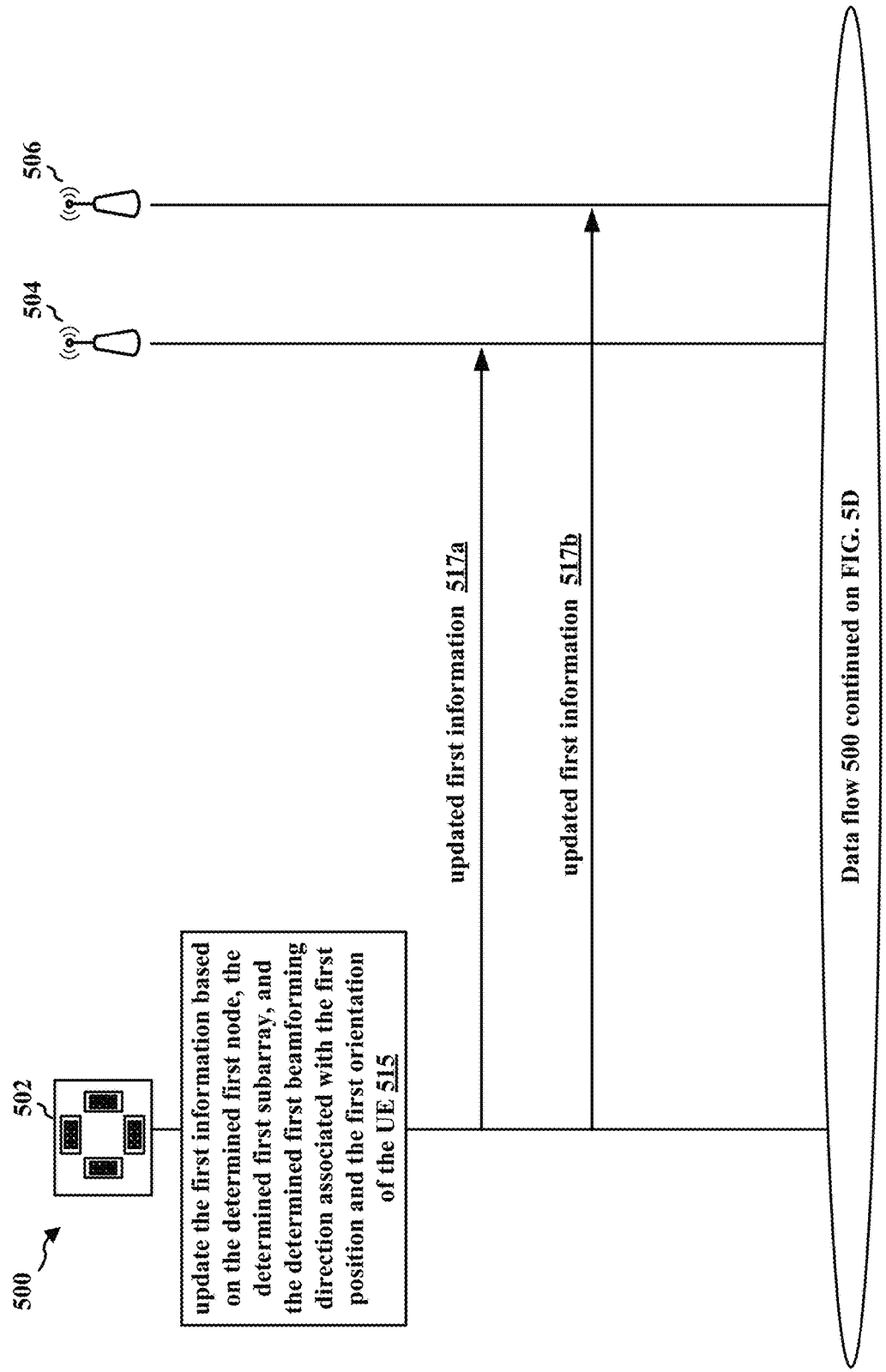

Referring to FIG. 5C, the wireless device 502 may update 515 the first information based on the node, subarray, and/or beamforming direction used for mmW communications at the first position and/or the first orientation. In one aspect, the wireless device 502 may update the first information by refining the first information for selection of a preferred node, a preferred subarray, and a preferred orientation for communicating with the plurality of nodes as the wireless device 502 changes position and orientation. For example, based on the node, subarray, and beamforming direction that the wireless device 502 uses for mmW communications at the first position and/or the first orientation, the wireless device 502 may update the first information in the look-up-table to reflect, e.g., that the second highest ranked combination is now the most preferred and reorder the different combinations accordingly.

In another aspect, the wireless device 502 may transmit the updated first information 517a, 517b to the first node 504 and the second node 506. Using the first information and/or the updated first information discussed above, the wireless device 502, the first node 504, and/or the second node 506 may be able to reduce the time needed to select a particular node, subarray, and/or beamforming direction for mmW communications.

Figure 5D:
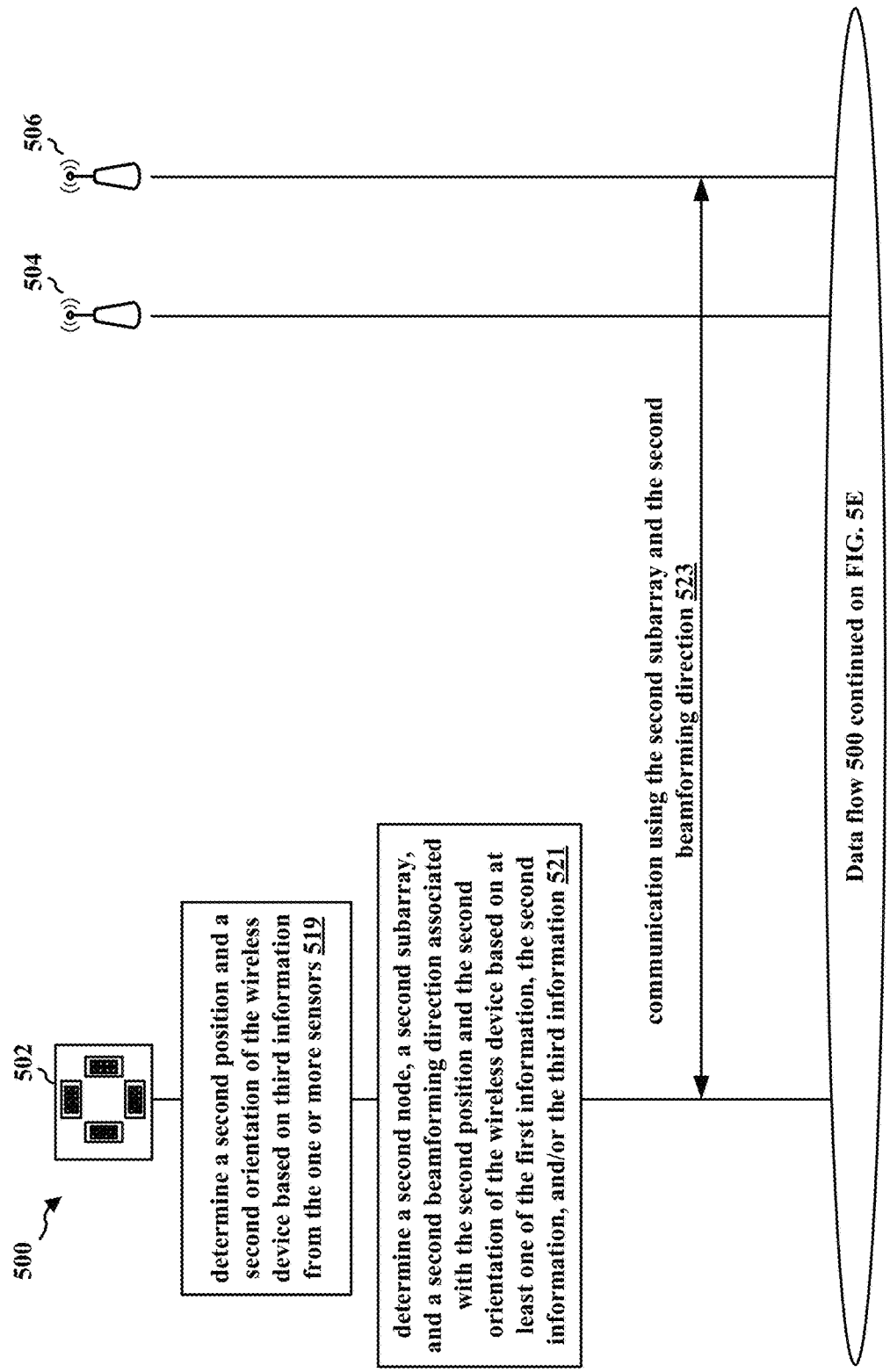

Referring to FIG. 5D, the wireless device 502 may determine 519 a second position and a second orientation based on third information (e.g., position information and/or orientation information) using measurements taken by one or more sensors (e.g., a GPS, an accelerometer, a gyroscope, etc.) at the wireless device 502. In one aspect, the at least one of the second position (e.g., see second position 712b in FIG. 7) may be different than the first position (e.g., see first position 712a in FIG. 7) or the second orientation (e.g., see the orientation of the subarrays at the second position 712b in FIG. 7) may be different than the first orientation (e.g., see the orientation of the subarrays at the first position 712a in FIG. 7).

In a further aspect, using one or more of the first information, the second information, and/or the third information, the wireless device 502 may determine 521 a preferred node, a preferred subarray, and a preferred beamforming direction associated with the second position and/or the second orientation of the wireless device 502 (e.g., predictive beamforming—see FIG. 7). For example, the wireless device 502 may determine a second node (e.g., first node 704 in FIG. 7), a second subarray (e.g., subarray 710a at the second position 712b in FIG. 7), and a second beamforming direction (e.g., beamforming direction 701b in FIG. 7) based on the first information, the second information, and/or the third information. In one aspect, the second node (e.g., see the first node 704 at the second position 712*b* in FIG. 7) may be different than the first node (e.g. see the second node 706 at the first position 712*a* in FIG. 7), the second subarray (e.g., see subarray 710*a* at the second position 712*b* in FIG. 7) may be different than the first subarray (e.g., see subarray 710*b* at the first position 712*a*), and/or the second beamforming direction (e.g., see beamforming direction 701*b* in FIG. 7) may be different than the first beamforming direction (e.g., see beamforming direction 701*a* in FIG. 7). In another aspect, the wireless device 502 may access the look-up-table that includes the first information, and using the current location and/or orientation information, the wireless device 502 may determine which of the nodes, subarrays, and/or beamforming directions to use for mmW communications without performing a scanning procedure. In the particular example illustrated in FIG. 5D, the wireless device 502 determines to communicate 523 with the second node 506, using a second subarray, and a second beamforming direction.

Figure 5E:
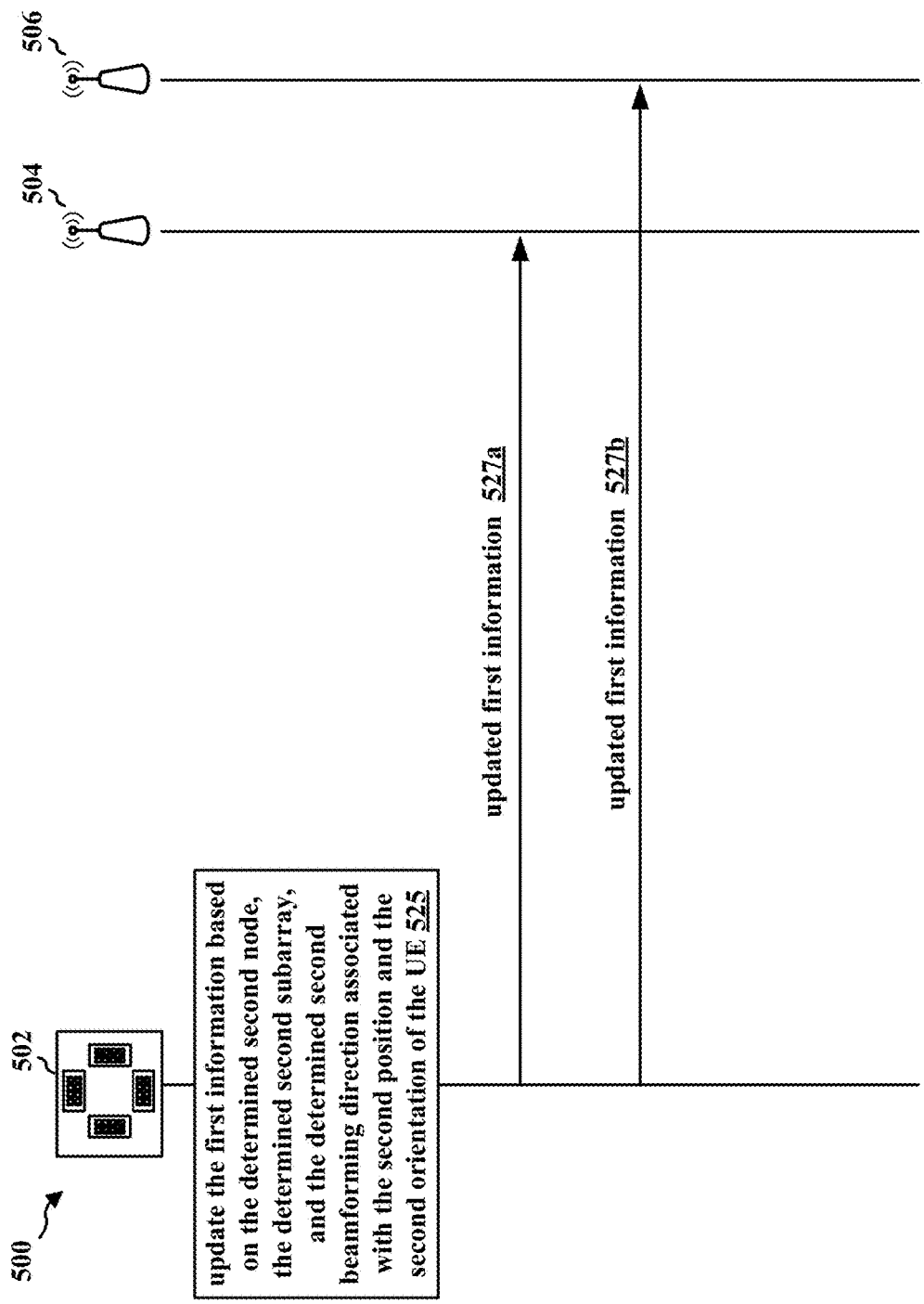

Referring to FIG. 5E, the wireless device 502 may update 525 the first information based on the node, subarray, and/or beamforming direction used for mmW communications at the second position and/or the second orientation. In one aspect, the wireless device 502 may update the first information by refining the first information for selection of a preferred node, a preferred subarray, and a preferred orientation in communicating with the plurality of nodes as the wireless device 502 changes position and orientation. For example, based on the node, subarray, and beamforming direction that the wireless device 502 uses for mmW communications 523 at the second position and/or second orientation, the wireless device 502 may update the first information in the look-up-table.

In another aspect, the wireless device 502 may transmit the updated first information 527*a*, 527*b* to the first node 504 and the second node 506. Using the first information and/or the updated first information discussed above, the wireless device 502, the first node 504, and/or the second node 506 may be able to reduce the time needed to select a particular node, subarray, and/or beamforming direction for mmW communications.

Figure 6:
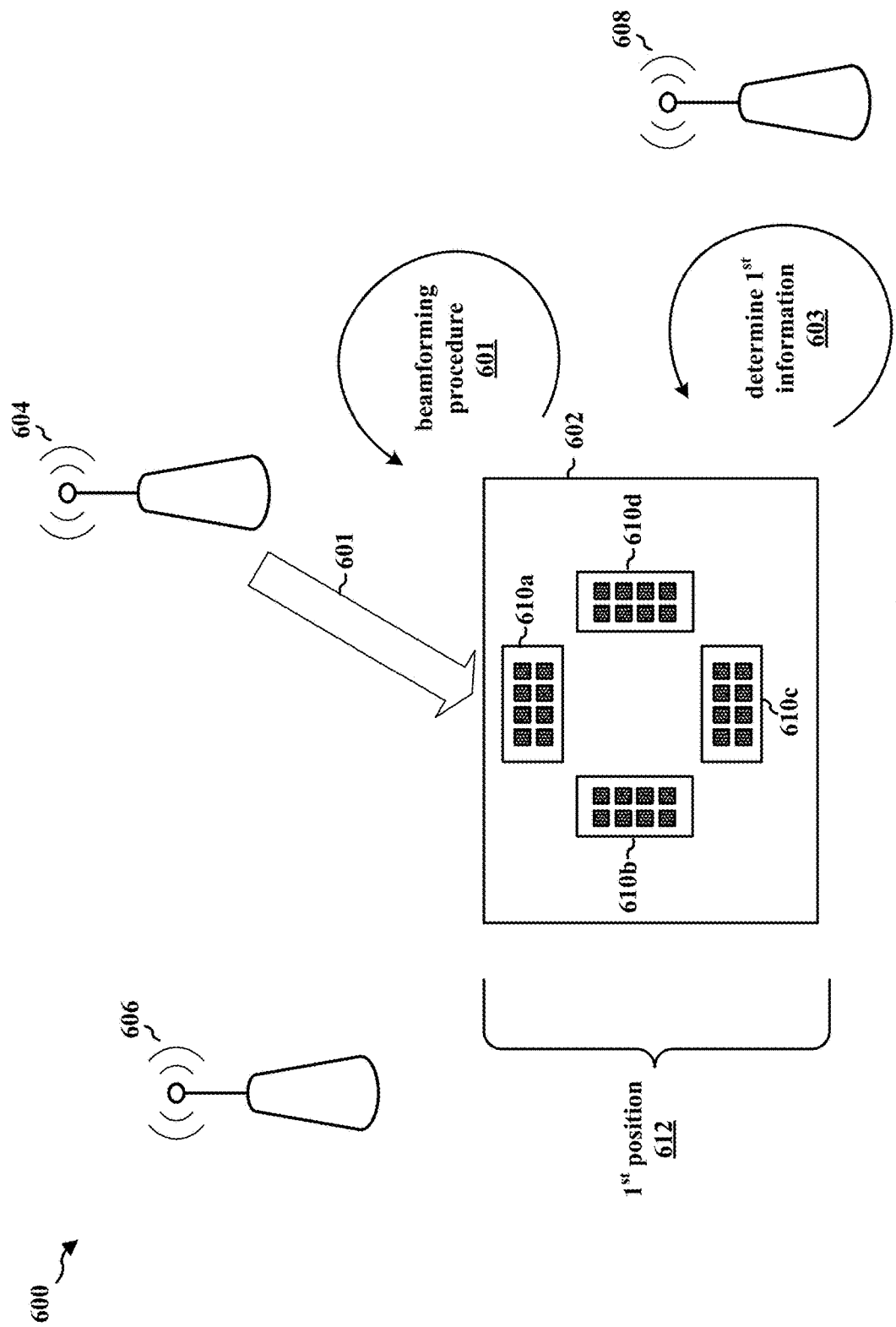
FIG. 6 illustrates a beamforming procedure in accordance with certain aspects of the disclosure.

FIG. 6 is a diagram illustrating a beamforming procedure 600 used to determine beamforming calibration information by a wireless device 602 moving through an area that includes a first node 604, a second node 606, and a third node 608 in accordance with certain aspects of the disclosure. The wireless device 602 may correspond to, e.g., UE 104, 350, STA 152, wireless device 502, 702, the apparatus 902, 902'. The first node 604 may correspond to, e.g., base station 102, 180, eNB 310, node 504, 506, 704, 706, 708, 950, 955. The second node 606 may correspond to, e.g., base station 102, 180, eNB 310, node 504, 506, 704, 706, 708, 950, 955. The third node 608 may correspond to, e.g., base station 102, 180, eNB 310, node 504, 506, 704, 706, 708, 950, 955. Although three nodes are illustrated in FIG. 6, more or fewer than three nodes may be used to determine beamforming calibration information without departing form the scope of the present disclosure.

The wireless device 602 depicted in FIG. 6 may be moving through an area that includes first node 604, second node 606, and third node 608, and performing a beamforming procedure 600 to determine first information 603. In addition, the wireless device 602 is depicted as having four subarrays 610*a*, 610*b*, 610*c*, 610*d*, and as being located at first position 612. However, the wireless device 602 may include more or fewer than four subarrays without departing from the scope of the present disclosure.

In the example illustrated in FIG. 6, the wireless device 602 may determine, at the first position 612, that the first node 604 is the preferred node. In addition, at the first position 612, the wireless device 602 may determine that subarray 610*a* is the preferred subarray. At the first position 612, the wireless device may also determine the preferred beamforming direction 601. As the wireless device 602 moves through the area, the beamforming procedure discussed above may be performed at multiple locations with multiple orientations to determine first information 603 (e.g., see 505 in FIG. 5A) that is maintained by the wireless device 602.

FIG. 7 is a diagram illustrating a predictive beamforming procedure 700 using the first information discussed above with respect to FIGS. 5A-5E and 6 to determine a preferred node, a preferred subarray, and a preferred beamforming direction for mmW communications at a particular location and/or orientation in accordance with certain aspects of the disclosure. Wireless device 702 may correspond to, e.g., UE 104, 350, STA 152, wireless device 502, 602, the apparatus 902, 902'. First node 704 may correspond to, e.g., base station 102, 180, eNB 310, node 504, 506, 604, 606, 608, 950, 955. Second node 706 may correspond to, e.g., base station 102, 180, eNB 310, node 504, 506, 604, 606, 608, 950, 955. Third node 708 may correspond to, e.g., base station 102, 180, eNB 310, node 504, 506, 604, 606, 608, 950, 955. Although three nodes are illustrated in FIG. 7, more or fewer than three nodes may be located in an area without departing form the scope of the present disclosure.

The wireless device 702 depicted in FIG. 7 may move through an area that includes first node 704, second node 706, and third node 708, and perform predictive beamforming to determine a preferred node, a preferred subarray, and a preferred beamforming direction at a first position 712*a*, a second position 712*b*, and a third position 712*c*. In addition, the wireless device 702 is depicted as having four subarrays 710*a*, 710*b*, 710*c*, 710*d*. However, the wireless device 702 may include more or fewer than four subarrays without departing from the scope of the present disclosure.

In the example illustrated in FIG. 7, the wireless device 702 may determine, at the first position 712*a*, that the second node 706 is the preferred node. In addition, at the first position 712*a*, the wireless device 702 may determine that subarray 710*b* is the preferred subarray. At the first position 712*a*, the wireless device 702 may also determine the preferred beamforming direction 701*a*.

Still referring to the example illustrated in FIG. 7, the wireless device 702 may determine, at the second position 712*b*, that the first node 704 is the preferred node. In addition, at the second position 712*b*, the wireless device 702 may determine an orientation change (e.g., a change in the subarray orientation) and that subarray 710*a* is the preferred subarray. At the second position 712*b*, the wireless device 702 may also determine the preferred beamforming direction 701*b*.

Still referring to the example illustrated in FIG. 7, the wireless device 702 may determine, at the third position 712*c*, that the third node 708 is the preferred node. In addition, at the third position 712*c*, the wireless device 702 may determine that subarray 710*c* is the preferred subarray. At the third position 712*c*, the wireless device 702 may also determine the preferred beamforming direction 701*c*.

As the wireless device 702 moves through the area, the maintained first information (e.g., see 505 in FIG. 5A) may be used to determine the preferred node, the preferred subarray, and/or the preferred beamforming direction at each of the first position 712*a*, the second position 712*b*, and the third position 712*c*. Based on the determinations made at each location, the wireless device 702 may update the first information to refine the maintained first information.

Figure 8A:
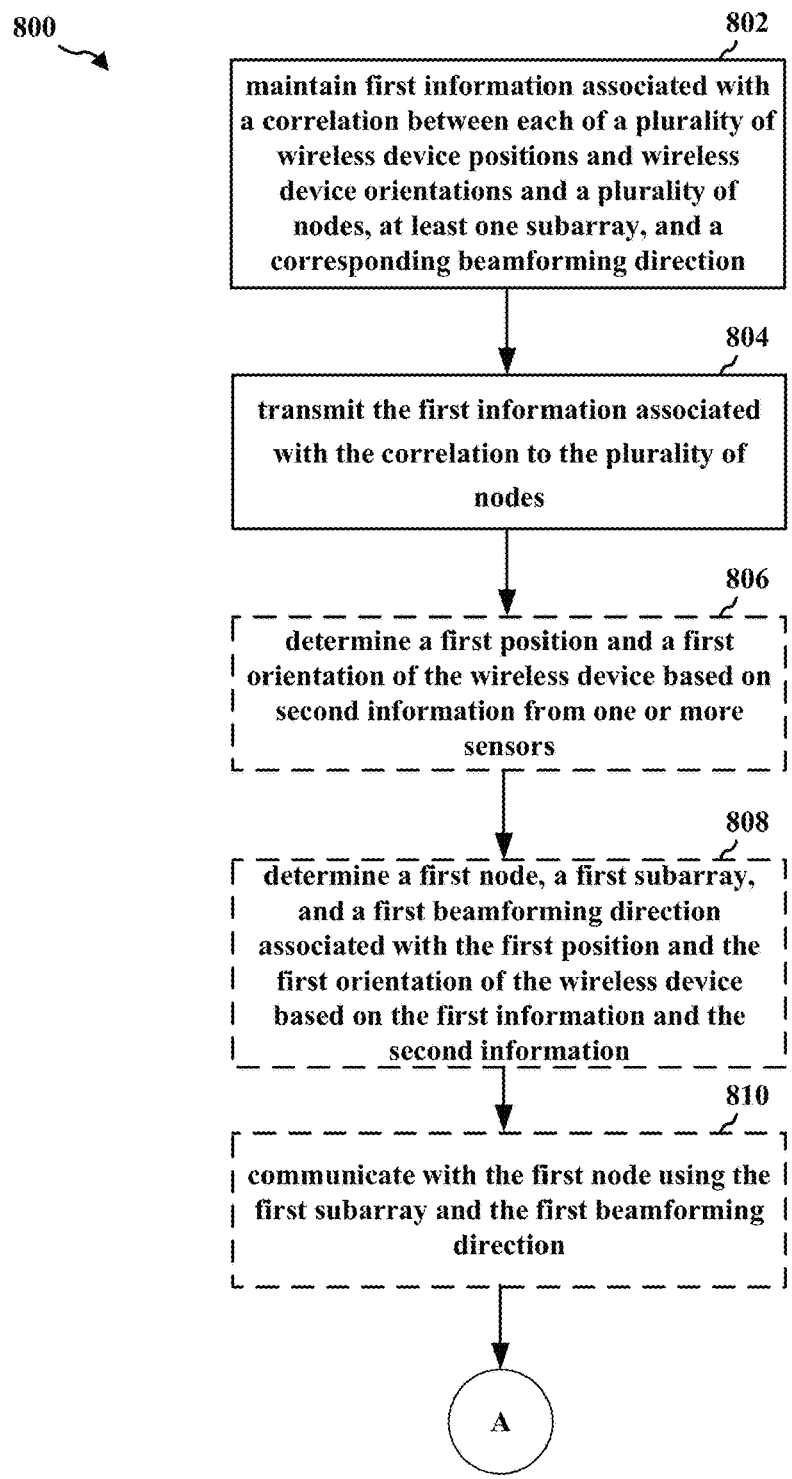
FIGS. 8A-8C are a flowchart of a method of wireless communication.
Figure 8B:
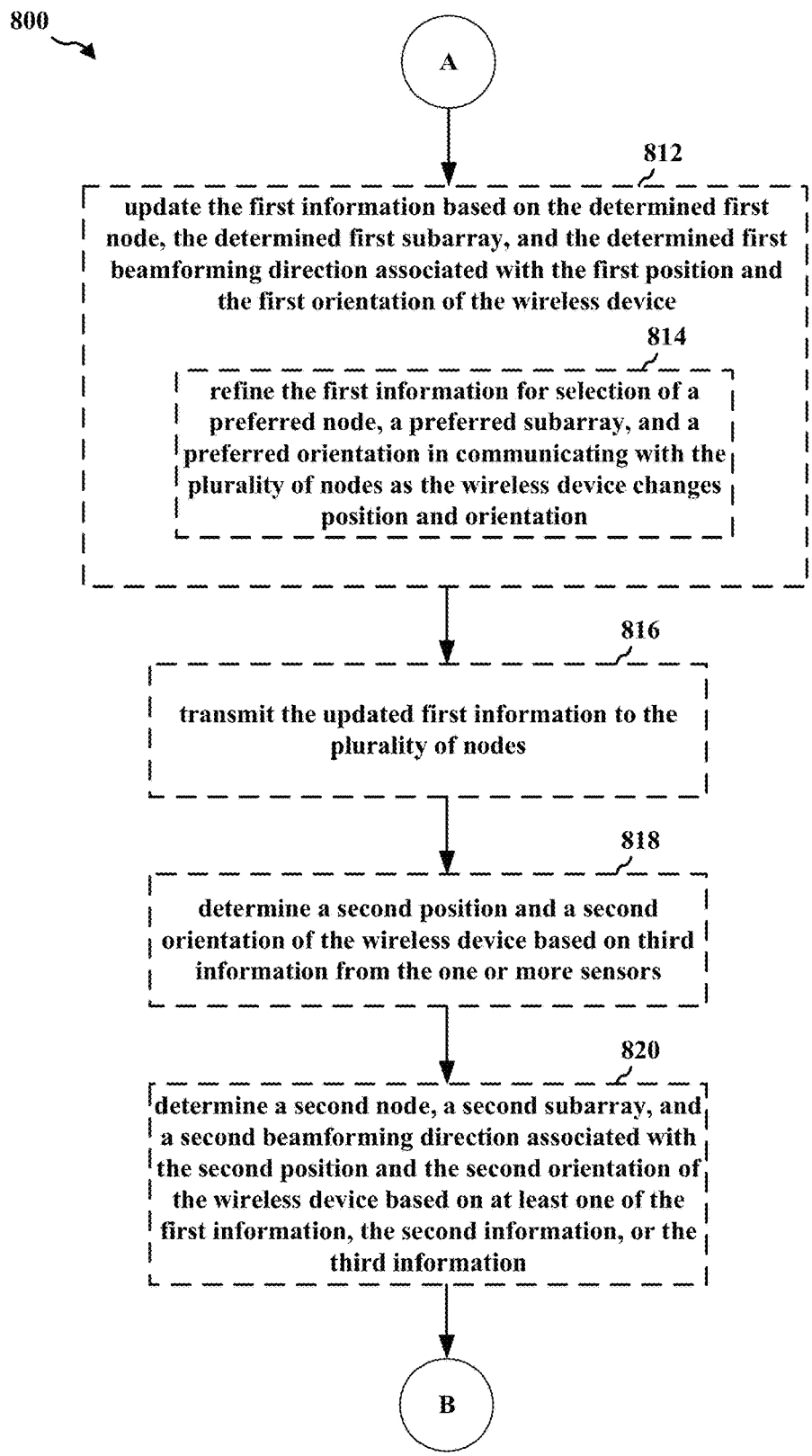
Figure 8C:
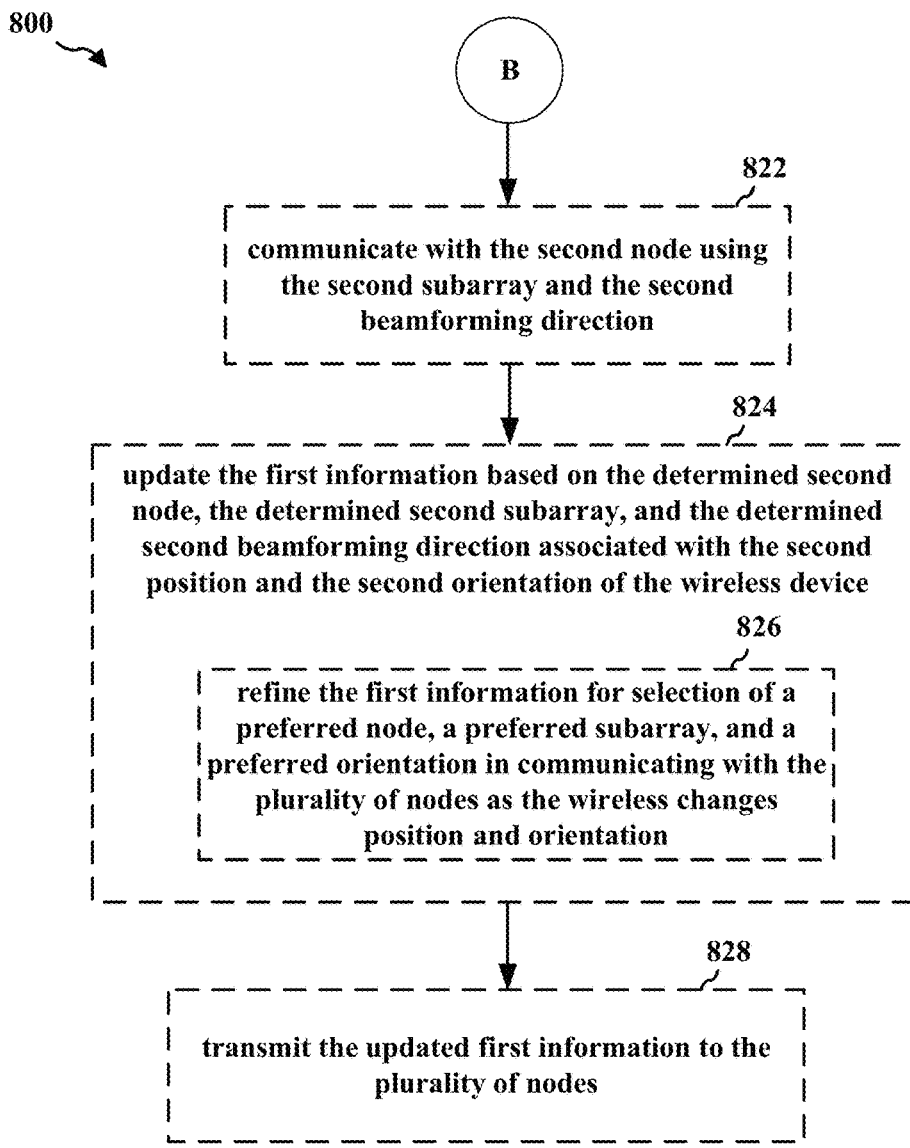

FIGS. 8A-8C are a flowchart 800 of a method of wireless communication. The method may be performed by a wireless device (e.g., the UE 104, 350, STA 152, wireless device 502, 602, 702, the apparatus 902, 902') in communication with a plurality of nodes (e.g., the base station 102, 180, eNB 310, node 504, 506, 604, 606, 608, 704, 706, 708, 950, 955). In FIGS. 8A-8C, operations indicated with dashed lines may represent optional operations.

Referring to FIG. 8A, at 802, the wireless device may maintain first information associated with a correlation between each of a plurality of wireless device positions and wireless device orientations and a plurality of nodes, at least one subarray, and a corresponding beamforming direction. For example, referring to FIG. 5A, the wireless device 502 may maintain 505 first information (e.g., beamforming calibration information) associated with a correlation between each of a plurality of wireless device positions and wireless device orientations, and at least one preferred node, at least one preferred subarray, and at least one preferred beamforming direction obtained during the beamforming procedure 501, 503. In one aspect, the first information (e.g., look-up-table of beamforming calibration information) may be maintained locally at the wireless device 502. In another configuration, the first information may be maintained externally to the wireless device 502, and accessed by the wireless device 502 using one of radio access technologies discussed above.

At 804, the wireless device may transmit the first information associated with the correlation to a plurality of nodes. For example, referring to FIG. 5A, the wireless device 502 may transmit the first information 507*a*, 507*b* to the first node 504 and the second node 506.

At 806, the wireless device may determine a position and an orientation of the wireless device based on second information from one or more sensors. For example, referring to FIG. 5B, the wireless device 502 may determine 509 a position and/or an orientation of the wireless device 502 based on second information (e.g., position information and/or orientation information) using measurements taken by one or more sensors at the wireless device 502. For example, the location information may be obtained using, e.g., a GPS and/or an accelerometer located at the wireless device 502. The orientation information may be obtained using, e.g., a gyroscope located at the wireless device 502.

At 808, the wireless device may determine a first node, a first subarray, and a first beamforming direction associated with the position and orientation of the wireless device based on the first information and the second information. For example, referring to FIG. 5B, using the first information and/or the second information, the wireless device 502 may determine 511 a preferred node, a preferred subarray, and a preferred beamforming direction associated with the position and orientation of the wireless device 502 (e.g., predictive beamforming—see FIG. 7). For example, the wireless device 502 may access the look-up-table that includes the first information, and using the current location and/or orientation information, the wireless device 502 may determine which of the nodes, subarrays, and/or beamforming directions to use for mmW communications without performing a scanning procedure. In the particular example illustrated in FIG. 5B, the wireless device 502 determines to communicate 513 with the first node 504, using a first subarray, and a first beamforming direction. The look-up-table may include, e.g., a hierarchy of different combinations of preferred nodes, subarrays, and/or beamforming directions for each location that are ranked based on preference. For example, if the highest ranked combination (e.g., a first node, a first subarray, and/or a first beamforming direction) does not support mmW communications, then the wireless device 502 may select the second highest ranked combination (e.g., a second node, a second subarray, and/or a second beamforming direction) for mmW communications. In one aspect, one or more of the first node, first subarray, and/or first beamforming direction in the highest ranked combination may be the same as the second node, the second subarray, and/or the second beamforming direction in the second highest ranked combination. In another aspect, one or more of the first node, first subarray, and/or first beamforming direction in the highest ranked combination may be the different than the second node, the second subarray, and/or the second beamforming direction in the second highest ranked combination. Referring to FIG. 7, the wireless device 702 may determine, at the first position 712*a*, that the second node 706 is the preferred node. In addition, at the first position 712*a*, the wireless device 702 may determine that subarray 710*b* is the preferred subarray. At the first position 712*a*, the wireless device 702 may also determine the preferred beamforming direction 701*a*. Still referring to the example illustrated in FIG. 7, the wireless device 702 may determine, at the second position 712*b*, that the first node 704 is the preferred node. In addition, at the second position 712*b*, the wireless device 702 may determine that subarray 710*d* is the preferred subarray. At the second position 712*b*, the wireless device 702 may also determine the preferred beamforming direction 701*b*. Still referring to the example illustrated in FIG. 7, the wireless device 702 may determine, at the third position 712*c*, that the third node 708 is the preferred node. In addition, at the third position 712*c*, the wireless device 702 may determine that subarray 710*c* is the preferred subarray. At the third position 712*c*, the wireless device 702 may also determine the preferred beamforming direction 701*c*.

At 810, the wireless device may communicate with the first node using the first subarray and the first beamforming direction. For example, referring to FIG. 5B, the wireless device 502 may determine to communicate 513 with the first node 504, using a first subarray, and a first beamforming direction.

Referring to FIG. 8B, at 812, the wireless device may update the first information based on the determined first node, the determined first subarray, and the determined first beamforming direction associated with the position and the orientation of the wireless. For example, referring to FIG. 5C, the wireless device 502 may update 515 the first information based on the node, subarray, and/or beamforming direction used for mmW communications at a particular location and/or orientation. For example, based on the node, subarray, and beamforming direction the wireless device 502 uses for mmW communications, the wireless device 502 may update the first information in the look-up-table to reflect, e.g., that the second highest ranked combination is now the most preferred and reorder the different combinations accordingly.

At 814, the wireless device may update the first information by refining the first information for selection of a preferred node, a preferred subarray, and a preferred orientation in communicating with the plurality of nodes as the wireless device changes position and orientation. For example, referring to FIG. 5C, the wireless device 502 may update the first information by refining the first information for selection of a preferred node, a preferred subarray, and a preferred orientation in communicating with the plurality of nodes as the wireless device 502 changes position and orientation. For example, based on the node, subarray, and beamforming direction the wireless device 502 uses for mmW communications, the wireless device 502 may update the first information in the look-up-table to reflect, e.g., that the second highest ranked combination is now the most preferred and reorder the different combinations accordingly.

At 816, the wireless device may transmit the updated first information to the plurality of nodes. For example, referring to FIG. 5C, the wireless device 502 may transmit the updated first information 517a, 517b to the first node 504 and the second node 506. Using the first information and/or the updated first information discussed above, the wireless device 502, the first node 504, and/or the second node 506 may be able to reduce the time needed to select a particular node, subarray, and/or beamforming direction for mmW communications.

At 818, the wireless device may determine a second position and a second orientation of the wireless device based on third information from the one or more sensors. In one aspect, at least one of the second position may be different than the first position or the second orientation may be different than the first orientation. For example, referring to FIG. 5D, may determine 519 a second position and a second orientation based on third information (e.g., position information and/or orientation information) using measurements taken by one or more sensors (e.g., a GPS, an accelerometer, a gyroscope, etc.) at the wireless device 502. In one aspect, the at least one of the second position (e.g., see second position 712b in FIG. 7) may be different than the first position (e.g., see first position 712a in FIG. 7) or the second orientation (e.g., see the orientation of the subarrays at the second position 712b in FIG. 7) may be different than the first orientation (e.g., see the orientation of the subarrays at the first position 712a in FIG. 7).

At 820, the wireless device may determine a second node, a second subarray, and a second beamforming direction associated with the second position and the second orientation of the wireless device based on at least one of the first information, the second information, or the third information. In one aspect, at least one of the second node may be different than the first node, the second subarray may be different than the first subarray, or the second beamforming direction may be different than the first beamforming direction. For example, referring to FIG. 5D, using one or more of the first information, the second information, and/or the third information, the wireless device 502 may determine 521 a preferred node, a preferred subarray, and a preferred beamforming direction associated with the second position and/or the second orientation of the wireless device 502 (e.g., predictive beamforming—see FIG. 7). For example, the wireless device 502 may determine a second node (e.g., first node 704 in FIG. 7), a second subarray (e.g., subarray 710a at the second position 712b in FIG. 7), and a second beamforming direction (e.g., beamforming direction 701b in FIG. 7) based on the first information, the second information, and/or the third information. In one aspect, at least one of the second node (e.g., see the first node 704 at the second position 712b in FIG. 7) may be different than the first node (e.g. see the second node 706 at the first position 712a in FIG. 7), the second subarray (e.g., see subarray 710a at the second position 712b in FIG. 7) may be different than the first subarray (e.g., see subarray 710b at the first position 712a), or the second beamforming direction (e.g., see beamforming direction 701b in FIG. 7) may be different than the first beamforming direction (e.g., see beamforming direction 701a in FIG. 7). In another aspect, the wireless device 502 may access the look-up-table that includes the first information, and using the current location and/or orientation information, the wireless device 502 may determine which of the nodes, subarrays, and/or beamforming directions to use for mmW communications without performing a scanning procedure.

Referring to FIG. 8C, at 822, the wireless device may communicate with the second node using the second subarray and the second beamforming direction. For example, referring to FIG. 5D, the wireless device 502 may determine to communicate 523 with the second node 506, using a second subarray, and a second beamforming direction.

At 824, the wireless device may update the first information based on the determined second node, the determined second subarray, and the determined second beamforming direction associated with the second position and the second orientation of the wireless device. For example, referring to FIG. 5E, the wireless device 502 may update 525 the first information based on the node, subarray, and/or beamforming direction used for mmW communications at the second position and/or the second orientation.

At 826, the wireless device may update the first information by refining the first information for selection of a preferred node, a preferred subarray, and a preferred orientation in communicating with the plurality of nodes as the wireless changes position and orientation. For example, referring to FIG. 5E, the wireless device 502 may update the first information by refining the first information for selection of a preferred node, a preferred subarray, and a preferred orientation in communicating with the plurality of nodes as the wireless device 502 changes position and orientation. For example, based on the node, subarray, and beamforming direction that the wireless device 502 uses for mmW communications 523 at the second position and/or second orientation, the wireless device 502 may update the first information in the look-up-table.

At 828, the wireless device may transmit the updated first information to the plurality of nodes. For example, referring to FIG. 5E, the wireless device 502 may transmit the updated first information 527a, 527b to the first node 504 and the second node 506. Using the first information and/or updated first information discussed above, the wireless device 502, the first node 504, and/or the second node 506 may be able to reduce the time needed to select a particular node, subarray, and/or beamforming direction for mmW communications.

Figure 9:
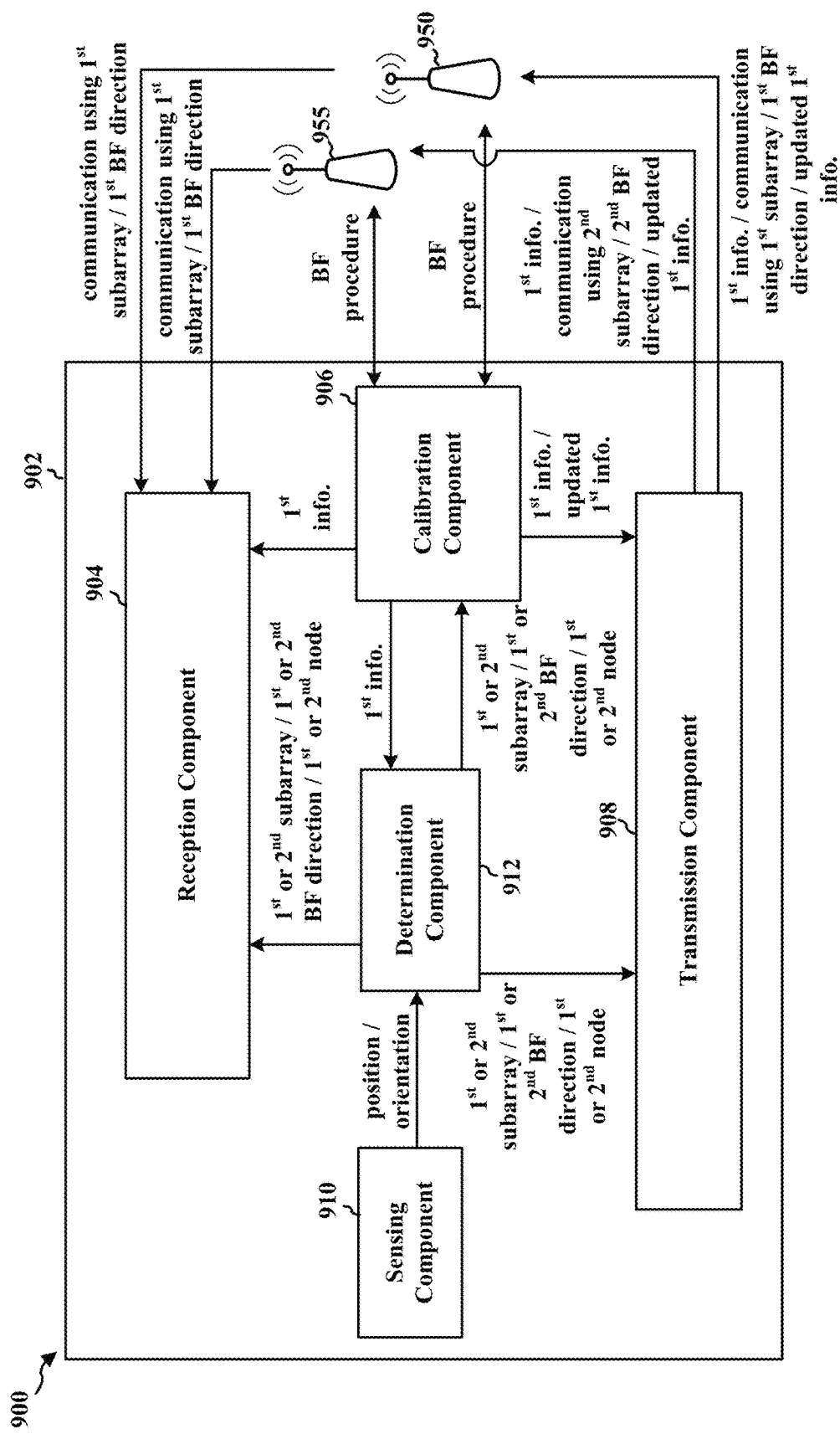
FIG. 9 is a conceptual data flow diagram illustrating the data flow between different means/components in an exemplary apparatus.

FIG. 9 is a conceptual data flow diagram 900 illustrating the data flow between different means/components in an exemplary apparatus 902. The apparatus may be a wireless device (e.g., the UE 104, 350, STA 152, wireless device 502, 602, 702, the apparatus 902, 902') in communication with a first node 950 (e.g., the base station 102, 180, eNB 310, node 504, 506, 604, 606, 608, 704, 706, 708, 950, 955) and a second node 955 (e.g., the base station 102, 180, eNB 310, node 504, 506, 604, 606, 608, 704, 706, 708, 950, 955). The apparatus may include a reception component 904, a calibration component 906, a transmission component 908, a sensing component 910, and a determination component 912. The calibration component 906 may be configured to perform a beamforming procedure with the first node 950 and the second node 955. In addition, the calibration component 906 may be configured to determine a preferred node, a preferred subarray, and a preferred beamforming direction for each of a plurality of different wireless device locations and/or wireless device orientations. The calibration component 906 may also be configured to maintain first information associated with a correlation between each of a plurality of wireless device positions and wireless device orientations and a plurality of nodes, at least one subarray, and a corresponding beamforming direction. The calibration component 906 may be configured to send a signal associated with the first information to one or more of the reception component 904, the transmission component 908, and/or the determination component 912. The transmission component 908 may be configured to transmit the first information associated with the correlation to a plurality of nodes 950, 955. The sensing component 910 may be configured to sense one or more of a position and/or orientation (e.g., second information) associated with the wireless device. The sensing component 910 may be configured to send a signal associated with the second information to the determination component 912. The determination component 912 may be configured to determine a position and an orientation of the wireless device based on second information from one or more sensors. The determination component 912 may be configured to determining a first node, a first subarray, and a first beamforming direction associated with the position and orientation of the wireless device based on the first information and the second information. The determination component 912 may be configured to send a signal associated with one or more of the first node, the first subarray, and the first beamforming direction associated with the first position and first orientation of the wireless device to one or more of the reception component 904, the calibration component 906, and/or the transmission component 908. The reception component 904 and/or the transmission component 908 may be configured to communicate with the first node 950 using the first subarray and the first beamforming direction. The calibration component 906 may be configured to update the first information based on the determined first node, the determined first subarray, and the determined first beamforming direction associated with the position and the orientation of the wireless. For example, the calibration component 906 may be configured to update the first information by refining the first information for selection of a preferred node, a preferred subarray, and a preferred orientation in communicating with the plurality of nodes as the wireless device changes position and orientation. The calibration component 906 may be configured to send a signal associated with the updated first information to the transmission component 908. The transmission component 908 may be configured to transmit the updated first information to the plurality of nodes 950, 955. The sensing component 910 may be configured to sense one or more of a change in position and/or orientation (e.g., third information) associated with the wireless device. Further, the sensing component 910 may be configured to send a signal associated with the change in position and/or orientation to the determination component 912. The determination component 912 may be configured to determine a second position and a second orientation of the wireless device based on third information from the one or more sensors. In one aspect, at least one of the second position may be different than the first position or the second orientation may be different than the first orientation. The determination component 912 may be configured to send a signal associated with one or more of the second node, the second subarray, and the second beamforming direction associated with the second position and second orientation of the wireless device to one or more of the reception component 904, the calibration component 906, and/or the transmission component 908. The reception component 904 and/or the transmission component 908 may be configured to communicate with the second node 955 using the second subarray and the second beamforming direction. The calibration component 906 may be configured to update the first information based on the determined second node, the determined second subarray, and the determined second beamforming direction associated with the position and the orientation of the wireless. For example, the calibration component 906 may be configured to update the first information by refining the first information for selection of a preferred node, a preferred subarray, and a preferred orientation in communicating with the plurality of nodes as the wireless device changes position and orientation. The calibration component 906 may be configured to send a signal associated with the updated first information to the transmission component 908. The transmission component 908 may be configured to transmit the updated first information to the plurality of nodes 950, 955.

The apparatus may include additional components that perform each of the blocks of the algorithm in the aforementioned flowcharts of FIGS. 8A-8C. As such, each block in the aforementioned flowcharts of FIGS. 8A-8C may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
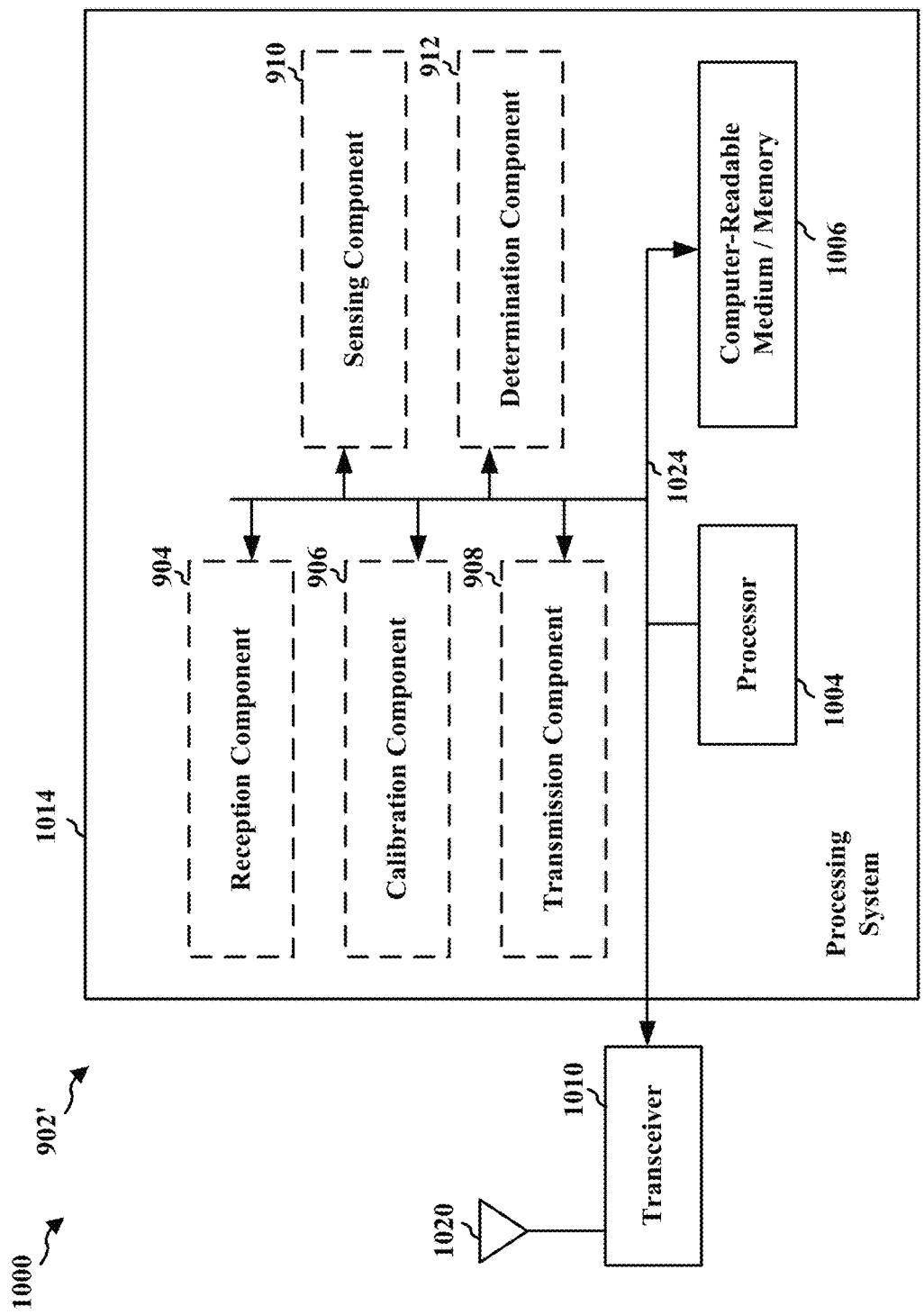
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910, 912, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 908, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described above for any particular apparatus. The computer-readable medium/memory 1006 may also be used for storing data that is manipulated by the processor 1004 when executing software. The processing system 1014 further includes at least one of the components 904, 906, 908, 910, 912. The components may be software components running in the processor 1004, resident/stored in the computer readable medium/memory 1006, one or more hardware components coupled to the processor 1004, or some combination thereof. The processing system 1014 may be a component of the UE 350 and may include the memory 360 and/or at least one of the TX processor 368, the RX processor 356, and the controller/processor 359.

In one configuration, the apparatus 902/902' for wireless communication may include means for maintaining first information associated with a correlation between each of a plurality of wireless device positions and wireless device orientations and a plurality of nodes, at least one subarray, and a corresponding beamforming direction. In another configuration, the apparatus 902/902' for wireless communication may include means for transmitting the first information associated with the correlation to a plurality of nodes. In a further configuration, the apparatus 902/902' for wireless communication may include means for determining a position and an orientation of the wireless device based on second information from one or more sensors. In one configuration, the apparatus 902/902' for wireless communication may include means for determining a first node, a first subarray, and a first beamforming direction associated with the position and orientation of the wireless device based on the first information and the second information. In another configuration, the apparatus 902/902' for wireless communication may include means for communicating with the first node using the first subarray and the first beamforming direction. In a further configuration, the apparatus 902/902' for wireless communication may include means for updating the first information based on the determined first node, the determined first subarray, and the determined first beamforming direction associated with the position and the orientation of the wireless. For example, the means for updating the first information may be configured to refine the first information for selection of a preferred node, a preferred subarray, and a preferred orientation in communicating with the plurality of nodes as the wireless device changes position and orientation. In one configuration, the apparatus 902/902' for wireless communication may include means for transmitting the updated first information to the plurality of nodes. In another configuration, the apparatus 902/902' for wireless communication may include means for determining a second position and a second orientation of the wireless device based on third information from the one or more sensors. In one aspect, at least one of the second position may be different than the first position or the second orientation may be different than the first orientation. In a further aspect, the apparatus 902/902' for wireless communication may include means for determining a second node, a second subarray, and a second beamforming direction associated with the second position and the second orientation of the wireless device based on at least one of the first information, the second information, or the third information. In one aspect, at least one of the second node may be different than the first node, the second subarray may be different than the first subarray, or the second beamforming direction may be different than the first beamforming direction. In one aspect, the apparatus 902/902' for wireless communication may include means for communicating with the second node using the second subarray and the second beamforming direction. In another aspect, the apparatus 902/902' for wireless communication may include means for updating the first information based on the determined second node, the determined second subarray, and the determined second beamforming direction associated with the second position and the second orientation of the wireless device. In a further configuration, the apparatus 902/902' for wireless communication may include means for updating the first information by refining the first information for selection of a preferred node, a preferred subarray, and a preferred orientation in communicating with the plurality of nodes as the wireless changes position and orientation. In one configuration, the apparatus 902/902' for wireless communication may include means for transmitting the updated first information to the plurality of nodes. The aforementioned means may be one or more of the aforementioned components of the apparatus 902 and/or the processing system 1014 of the apparatus 902' configured to perform the functions recited by the aforementioned means. As described above, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module,"

"mechanism," "element," "device," and the like may not be a substitute for the word "means." As such, no claim element is to be construed as a means plus function unless the element is expressly recited using the phrase "means for."

What is claimed is:

1. A method of wireless communication for a wireless device, comprising:
   maintaining first information associated with a correlation between each of (1) a plurality of wireless device positions and wireless device orientations, and (2) a plurality of nodes, at least one subarray, and a corresponding beamforming direction;
   transmitting the first information associated with the correlation to the plurality of nodes; and
   determining, based on the first information, a first node of the plurality of nodes, a first subarray of the at least one subarray, and a first beamforming direction associated with a first position and a first orientation of the wireless device.

2. The method of claim 1, further comprising:
   determining the first position and the first orientation of the wireless device based on second information from one or more sensors;
   wherein the first node, the first subarray, and the first beamforming direction associated with the first position and the first orientation of the wireless device are further determined based on the second information.

3. The method of claim 2, further comprising:
   communicating with the first node using the first subarray and the first beamforming direction.

4. The method of claim 2, further comprising:
   updating the first information based on the determined first node, the determined first subarray, and the determined first beamforming direction associated with the first position and the first orientation of the wireless device.

5. The method of claim 4, wherein the updating the first information comprises refining the first information for selection of a preferred node, a preferred subarray, and a preferred orientation in communicating with the plurality of nodes as the wireless device changes position and orientation.

6. The method of claim 4, further comprising:
   transmitting the updated first information to the plurality of nodes.

7. The method of claim 3, further comprising:
   determining a second position and a second orientation of the wireless device based on third information from the one or more sensors, wherein at least one of the second position is different than the first position or the second orientation is different than the first orientation; and
   determining a second node, a second subarray, and a second beamforming direction associated with the second position and the second orientation of the wireless device based on at least one of the first information, the second information, or the third information, wherein at least one of the second node is different than the first node, the second subarray is different than the first subarray, or the second beamforming direction is different than the first beamforming direction.

8. The method of claim 7, further comprising:
   communicating with the second node using the second subarray and the second beamforming direction.

9. An apparatus for wireless communication for a wireless device, comprising:
   means for maintaining first information associated with a correlation between each of (1) a plurality of wireless device positions and wireless device orientations and (2) a plurality of nodes, at least one subarray, and a corresponding beamforming direction;
   means for transmitting the first information associated with the correlation to the plurality of nodes; and
   means for determining, based on the first information, a first node of the plurality of nodes, a first subarray of the at least one subarray, and a first beamforming direction associated with a first position and a first orientation of the wireless device.

10. The apparatus of claim 9, further comprising:
    means for determining the first position and the first orientation of the wireless device based on second information from one or more sensors;
    wherein the first node, the first subarray, and the first beamforming direction associated with the first position and the first orientation of the wireless device are further determined based on the second information.

11. The apparatus of claim 10 further comprising:
    means for communicating with the first node using the first subarray and the first beamforming direction.

12. The apparatus of claim 10, further comprising:
    means for updating the first information based on the determined first node, the determined first subarray, and the determined first beamforming direction associated with the first position and the first orientation of the wireless device.

13. The apparatus of claim 12, wherein the updating the first information comprises refining the first information for selection of a preferred node, a preferred subarray, and a preferred orientation in communicating with the plurality of nodes as the wireless device changes position and orientation.

14. The apparatus of claim 12, further comprising:
    transmitting the updated first information to the plurality of nodes.

15. The apparatus of claim 11, further comprising:
    means for determining a second position and a second orientation of the wireless device based on third information from the one or more sensors, wherein at least one of the second position is different than the first position or the second orientation is different than the first orientation; and
    means for determining a second node, a second subarray, and a second beamforming direction associated with the second position and the second orientation of the wireless device based on at least one of the first information, the second information, or the third information, wherein at least one of the second node is different than the first node, the second subarray is different than the first subarray, or the second beamforming direction is different than the first beamforming direction.

16. The apparatus of claim 15, further comprising:
    means for communicating with the second node using the second subarray and the second beamforming direction.

17. An apparatus for wireless communication for a wireless device, comprising:
    a memory; and
    at least one processor coupled to the memory and configured to:
       maintain first information associated with a correlation between each of (1) a plurality of wireless device positions and wireless device orientations and (2) a plurality of nodes, at least one subarray, and a corresponding beamforming direction;

transmit the first information associated with the correlation to the plurality of nodes; and determine, based on the first information, a first node of the plurality of nodes, a first subarray of the at least one subarray, and a first beamforming direction associated with a first position and a first orientation of the wireless device.

18. The apparatus of claim 17, wherein the at least one processor is further configured to:

determine the first position and the first orientation of the wireless device based on second information from one or more sensors;

wherein the first node, the first subarray, and the first beamforming direction associated with the first position and the first orientation of the wireless device are further determined based on the second information.

19. The apparatus of claim 18 wherein the at least one processor is further configured to:

communicate with the first node using the first subarray and the first beamforming direction.

20. The apparatus of claim 18, wherein the at least one processor is further configured to:

update the first information based on the determined first node, the determined first subarray, and the determined first beamforming direction associated with the first position and the first orientation of the wireless device.

21. The apparatus of claim 20, wherein the at least one processor is configured to update the first information by refining the first information for selection of a preferred node, a preferred subarray, and a preferred orientation in communicating with the plurality of nodes as the wireless device changes position and orientation.

22. The apparatus of claim 20, wherein the at least one processor is further configured to:

transmit the updated first information to the plurality of nodes.

23. The apparatus of claim 19, wherein the at least one processor is further configured to:

determine a second position and a second orientation of the wireless device based on third information from the one or more sensors, wherein at least one of the second position is different than the first position or the second orientation is different than the first orientation; and determine a second node, a second subarray, and a second beamforming direction associated with the second position and the second orientation of the wireless device based on at least one of the first information, the second information, wherein at least one of the second node is different than the first node, the second subarray is different than the first subarray, or the second beamforming direction is different than the first beamforming direction.

24. The apparatus of claim 23, wherein the at least one processor is further configured to:

communicate with the second node using the second subarray and the second beamforming direction.

25. A non-transitory computer-readable medium storing computer executable code, comprising code to:

maintain first information associated with a correlation between each of (1) a plurality of wireless device positions and wireless device orientations and (2) a plurality of nodes, at least one subarray, and a corresponding beamforming direction;

transmit the first information associated with the correlation to the plurality of nodes; and determine, based on the first information, a first node of the plurality of nodes, a first subarray of the at least one subarray, and a first beamforming direction associated with a first position and a first orientation of the wireless device.

26. The non-transitory computer-readable medium of claim 25, further comprising code to:

determine the first position and the first orientation of the wireless device based on second information from one or more sensors;

wherein the first node, the first subarray, and the first beamforming direction associated with the first position and the first orientation of the wireless device are further determined based on the second information.

27. The non-transitory computer-readable medium of claim 26, further comprising code to:

communicate with the first node using the first subarray and the first beamforming direction;

determine a second position and a second orientation of the wireless device based on third information from the one or more sensors, wherein at least one of the second position is different than the first position or the second orientation is different than the first orientation;

determine a second node, a second subarray, and a second beamforming direction associated with the second position and the second orientation of the wireless device based on at least one of the first information, the second information, the second subarray is different than the first subarray, or the second beamforming direction is different than the first beamforming direction; and communicating with the second node using the second subarray and the second beamforming direction.

28. The non-transitory computer-readable medium of claim 26, further comprising code to:

update the first information based on the determined first node, the determined first subarray, and the determined first beamforming direction associated with the first position and the first orientation of the wireless device.

29. The non-transitory computer-readable medium of claim 28, wherein the code to update the first information is configured to refine the first information for selection of a preferred node, a preferred subarray, and a preferred orientation in communicating with the plurality of nodes as the wireless device changes position and orientation.

30. The non-transitory computer-readable medium of claim 28, further comprising code to:

transmit the updated first information to the plurality of nodes.

* * * * *